(12) United States Patent
Wang et al.

(10) Patent No.: US 11,900,031 B2
(45) Date of Patent: Feb. 13, 2024

(54) SYSTEMS AND METHODS OF COMPOSITE LOAD MODELING FOR ELECTRIC POWER SYSTEMS

(71) Applicants: State Grid Smart Grid Research Institute Co., Ltd., Beijing (CN); State Grid Corporation of China Co. Ltd, Beijing (CN); State Grid Jiangsu Electric Power Co., LTD., Jiangsu (CN); State Grid Shandong Electric Power Company, Shandong (CN)

(72) Inventors: Yishen Wang, San Jose, CA (US); Xinan Wang, San Jose, CA (US); Haifeng Li, Jiangsu (CN); Chunlei Xu, Jiangsu (CN); Di Shi, San Francisco, CA (US); You Lin, San Jose, CA (US); Siqi Wang, San Jose, CA (US); Zhiwei Wang, San Jose, CA (US); Jing Cao, Nanjing (CN); Bo Guo, Nanjing (CN); Zhengyang Ding, Nanjing (CN)

(73) Assignees: State Grid Smart Research Institute Co., Ltd., Beijing (CN); State Grid Corporation of China Co., Ltd, Beijing (CN); State Grid Jiangsu Electric Power Co., Ltd., Jiangsu (CN); State Grid Shandong Electric Power Company, Shangdong (CN); State Grid Jiangsu Electric Power Co., Ltd., Information and Communication Branch, Nanjing (CN)

( * ) Notice: Subject to any disclaimer, the term of this patent is extended or adjusted under 35 U.S.C. 154(b) by 700 days.

(21) Appl. No.: 16/994,512

(22) Filed: Aug. 14, 2020

(65) Prior Publication Data
US 2021/0049314 A1 Feb. 18, 2021

Related U.S. Application Data

(60) Provisional application No. 62/887,167, filed on Aug. 15, 2019.

(51) Int. Cl.
*G06F 30/27* (2020.01)
*G06F 119/06* (2020.01)

(52) U.S. Cl.
CPC .......... *G06F 30/27* (2020.01); *G06F 2119/06* (2020.01)

(58) Field of Classification Search
CPC ... G06F 30/27; G06F 2119/06; G06F 2113/04
See application file for complete search history.

(56) References Cited

U.S. PATENT DOCUMENTS 8,706,309 B2 4/2014 Schweitzer, III et al.
9,829,880 B2 11/2017 Baone et al.
(Continued)

OTHER PUBLICATIONS

Cem Bila Power System Dynamic State Estimation and Load Modeling, A Thesis Department of Electrical and Computer Engineering, Northeastern University, Boston MA, Sep. 2013 (Year: 2013).*

(Continued)

*Primary Examiner* — Rehana Perveen
*Assistant Examiner* — Cuong V Luu
(74) *Attorney, Agent, or Firm* — Greenberg Traurig, LLP

(57) ABSTRACT

Systems and methods for generating a load model having composite load components for electric power systems are disclosed which include acquiring state information at a bus of the electric power system, acquiring a training event record, and generating the load model by sequentially executing steps of determining a final load component composition for a predetermined composite load model structure referencing to both the state information and the (Continued)

training event record, and determining a plurality of final load parameters corresponding to the final load component composition and the predetermined load model structure also referencing to both the state information and the training event record.

22 Claims, 20 Drawing Sheets

(56) References Cited

U.S. PATENT DOCUMENTS

| | | | |
|---|---|---|---|
| 2011/0251732 A1* | 10/2011 | Schweitzer, III . | H02J 13/00006 700/297 |
| 2015/0356213 A1 | 12/2015 | Pan et al. | |
| 2020/0293627 A1* | 9/2020 | Wang | G06F 30/367 |

OTHER PUBLICATIONS

Bravo et al., "Dynamic Load Modeling Technical Reference Document" NERC, 90 pages, Sep. 2016.

Bravo et al., "Fault Induced Delayed Voltage Recovery (FIDVR) Indicators" IEEE PES T&D Conference and Exposition, Chicago, IL, pp. 1-5, Apr. 14, 2014.

Chang et al., "Probabilistic Load Forecasting via Point Forecast Feature Integration" IEEE PES Innovative Smart Grid Technologies Asia, pp. 99-104, May 21, 2009.

Choi et al., "Multiple Solutions and Plateau Phenomenon in Measurement-Based Load Model Development: Issues and Suggestions" IEEE Transactions on Power Systems, vol. 24, No. 2, pp. 824-831, May 2009.

Cicilio et al., "Evaluating Measurement-Based Dynamic Load Modeling Techniques and Metrics" IEEE Transactions on Power Systems, vol. 35, No. 3, pp. 1805-1811, Oct. 25, 2019.

Duan et al., "Deep-Reinforcement-Learning-Based Autonomous Voltage Control for Power Grid Operations" IEEE Transactions on Power Systems, vol. 35, No. 1, pp. 814-817, Jan. 2020.

Duan et al., "Q-Learning-Based Damping Control of Wide-Area Power Systems Under Cyber Uncertainties" IEEE Transactions on Smart Grid, vol. 9, No. 6, pp. 6408-6418, Nov. 2018.

Duan et al., "Reinforcement-Learning-Based Optimal Control of Hybrid Energy Storage Systems in Hybrid AC-DC Microgrids" IEEE Transactions on Industrial Informatics, vol. 15, No. 9, pp. 5355-5364, Nov. 2018.

Durugkar et al., "TD Learning with Constrained Gradients" Under Review as a Conference Paper at ICLR, https://openreview.net/pdf?id=Bk-ofQZRb, pp. 1-7, 2018.

Gaikwad et al., "Implementation of the WECC Composite Load Model for Utilities Using the Component-Based Modeling Approach" IEEE/PES Transmission and Distribution Conference and Exposition, pp. 1-5, May 3, 2016.

Guo et al., "Parameter Estimation of a Complex Load Model Using Phasor Measurements" IEEE Power and Energy Conference at Champaign, Illinois, doi: 10.1109/PECI.2012.6184606, pp. 1-6, Feb. 24, 2012.

Haj-Ali et al., "A View on Deep Reinforcement Learning in System Optimization" pp. 1-14, arXiv preprint arXiv:1908.01275v3 [cs.LG] pp. 1-14, Sep. 4, 2019.

Han et al., "A Real Application of Measurement-Based Load Modeling in Large-Scale Power Grids and its Validation" IEEE Transactions on Power Systems, vol. 24, No. 4, pp. 1756-1764, Nov. 2009.

Hoshyarzadeh et al., "The Impact of CLOD Load Model Parameters on Dynamic Simulation of Large Power Systems" IEEE International Conference on Environment and Electrical Engineering and IEEE Industrial and Commercial Power Systems Europe (EEEIC/I&CPS Europe), pp. 1-6, Jun. 11, 2019.

Huang et al., "A Generic Modeling and Development Approach for WECC Composite Load Model" Electric Power Systems Research, vol. 172, pp. 1-10, Jul. 1, 2019.

Jin et al., "Load Modeling by Finding Support Vectors of Load Data from Field Measurements" IEEE Transactions on Power Systems, vol. 21, No. 2, pp. 726-735, May 1, 2006.

Ju et al., "Composite Load Models Based on Field Measurements and their Applications in Dynamic Analysis" IET Generation, Transmission & Distribution, vol. 1, No. 5, pp. 724-730, 2007.

Kim et al., "Fast and Reliable Estimation of Composite Load Model Parameters Using Analytical Similarity of Parameter Sensitivity" IEEE Transactions on Power Systems, vol. 31, No. 1, pp. 663-671, Jan. 2016.

Koenker et al., "Quantile Regression an Introduction" pp. 1-14, May 31, 2001.

Kosterev et al., "Load Modeling in Power System Studies: WECC Progress Update" IEEE Power and Energy Society General Meeting—Conversion and Delivery of Electrical Energy in the 21st Century, pp. 1-8, Jul. 20, 2008.

Li et al., "Dynamic Load Modeling for Industrial Facilities Using Template and PSS/E Composite Load Model Structure CLOD" IEEE/IAS 3rd Industrial and Commercial Power Systems Technical Conference (I&CPS), pp. 1-9, May 6, 2017.

Li et al., "Load Models for Modeling Dynamic Behaviors of Reactive Loads: Evaluation and Comparison" Electrical Power and Energy Systems, vol. 30, No. 9, pp. 497-503, Nov. 1, 2008.

Li et al., Transforming Cooling Optimization for Green Data Center via Deep Reinforcement Learning, IEEE Transactions on Cybernetics, vol. 50, No. 5, pp. 2002-2013, May 2020.

Lin et al., "Global Sensitivity Analysis in Load Modeling via Low-Rank Tensor" IEEE Transactions on Smart Grid, vol. 11, No. 3, pp. 2737-2740, May 2020.

Liu et al., "The Effects of Memory Replay in Reinforcement Learning," 56th Annual Allerton Conference on Communication, Control, and Computing (Allerton), Monticello, IL, pp. 478-485, doi: 10.1109/ALLERTON.2018.8636075, 2018.

Lu et al., "Composite Load Model Evaluation" Pacific Northwest National Lab (PNNL), Richland, WA, Sep. 30, 2007.

Milanovic et al., "International Industry Practice on Power System Load Modeling" IEEE Transactions on Power Systems, vol. 28, No. 3, pp. 3038-3046, Aug. 2013.

Quint, Ryan D. "A Look into Load Modeling: The Composite Load Model" NERC Dynamic Load Modeling & FIDVR Workshop, 50 pages, Sep. 30, 2015.

Renmu et al., "Composite Load Modeling via Measurement Approach" IEEE Transactions on Power Systems, vol. 21, No. 2, pp. 663-672, May 1, 2006.

Schaarschmidt et al., "Learning Runtime Parameters in Computer Systems with Delayed Experience Injection" Deep Reinforcement Learning Workshop, NIPS 2016, Barcelona, Spain, pp. 1-10.

Son et al., "Improvement of Composite Load Modeling Based on Parameter Sensitivity and Dependency Analyses" IEEE Transactions on Power Systems, vol. 29, No. 1, pp. 242-250, Jan. 2014.

Van Hasselt et al., Deep Reinforcement Learning with Double Q-Learning, https://arxiv.org/pdf/1509.06461.pdf, pp. 1-13, Dec. 8, 2015.

Wang et al., "Robust Time-Varying Parameter Identification for Composite Load Modeling" IEEE Transactions on Smart Grid vol. 10, No. 1, pp. 967-979, Sep. 26, 2017.

WECC Dynamic Composite Load Model (CMPLDW) Specifications, pp. 1-9, Jan. 27, 2015.

Zhang et al., "Dependency Analysis and Improved Parameter Estimation for Dynamic Composite Load Modeling" IEEE Transactions on Power Systems, vol. 32, No. 4, pp. 3287-3297, Jul. 2017.

Zhang et al., "Parameter Sensitivity and Dependency Analysis for the WECC Dynamic Composite Load Model" Proceedings of the 50th Hawaii International Conference on System Sciences, http://hdl.handle.net/10125/41540, pp. 1-8, 2017.

* cited by examiner

SYSTEMS AND METHODS OF COMPOSITE LOAD MODELING FOR ELECTRIC POWER SYSTEMS

CROSS-REFERENCE TO RELATED APPLICATIONS

This application claims priority to U.S. Provisional Application No. 62/887,167 filed on 15 Aug. 2019 and entitled "Two-stage WECC Composite Load Modelling with A Double Deep Q-Learning Networks Approach," and is herein incorporated by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, GEIRI North America, All Rights Reserved.

FIELD OF TECHNOLOGY

The present disclosure generally relates to electric power transmission and distribution system, and, more particularly, to systems and methods of developing load models and corresponding compositions and parameters for monitoring and analysis of electric power systems.

BACKGROUND OF TECHNOLOGY

Power generation systems, often in remote locations, generate electric power which is transmitted to distribution systems via transmission systems. The transmission systems transmit electric power to various distribution systems which may be coupled further to one or more utilities with various loads. The power generation systems, the transmission systems and the distribution system, together with the loads, are integrated with each other structurally and operationally and creates a complex electric power network. The complexity and dynamism of the electric power network requires an automated approach which helps to reduce losses and increase reliability.

Load modeling that dynamically estimates load parameters at an electric power system provides one of the automated approaches to monitoring power systems. Accurate dynamic load modeling is critical for power system transient stability analysis and various simulation-based studies. It is also known to improve the power system operation flexibility, reduce system operating costs, and better determine the corridor transfer limits. In the past few decades, both industry and academic researchers have widely used ZIP and induction motors (ZIP+IM) as the composite load model (CLM) for quantifying load characteristics, in which ZIP approximates the static load transient behaviors and the IM approximates the dynamic load transient behaviors. This ZIP+IM load model has shown to be effective for simulating many dynamics in the power system.

In recent years, however, the power industry has started to observe various new load components, including single-phase IM, distributed energy resources (DER), and loads interfaced via power electronics that are being increasingly integrated into the system. The high penetration of these new types of loads brings profound changes to the transient characteristics at the load end, which raises the necessity for more advanced load modeling. For example, the well-known fault-induced, delayed-voltage-recovery (FIDVR) event is caused by the stalling of low-inertia single-phase IMs when the fault voltage is lower than their stall thresholds. An FIDVR event poses potential voltage control losses and cascading failures in the power system; however, FIDVR cannot be modeled by a conventional CLM model. Given these conditions, the Western Electricity Coordinating Council Composite Load Model (WECC CLM) was proposed, which has shown to effectively capture the dynamic load responses over traditional load models in various stability studies and contingency analysis.

To date, the WECC CLM is available from multiple commercial simulation tools such as the DSATools™, GE PSLF, and PowerWorld Simulator. However, the detailed model structure, control logic, and parameter settings of the WECC CLM are limited by most of the software vendors, and thus not transparent to the public, which impacts the WECC CLM's general adoption and practicality. Furthermore, lack of detailed open-source information about the WECC CLM presents another major roadblock for conducting load modeling and parameter identification studies for system stability analysis.

Current WECC CLM works can be classified into two groups: component-based methods that rely on load surveys and measurement-based numerical fitting methods. In A. Gaikwad, P. Markham, and P. Pourbeik, "Implementation of the WECC composite load model for utilities using the component-based modeling approach," in 2016 IEEE/PES Transmission and Distribution Conference and Exposition (T&D), Dallas, TX, 2016, pp. 1-5, and P. Etingov, "Load model data tool (LMDT)," P. Etingov, "Load model data tool (LMDT)," https://svn.pnl.gov/LoadTool, the WECC CLM's parameters are estimated from surveys of different customer classes and load type statistics. However, the granularity and accuracy of the survey data depend entirely on the survey agency, and there are many assumptions being made that cannot be definitively verified. In addition, the survey is generally not up to date and does not reflect real-time conditions. In practice, all these limitations bring challenges in modeling the actual dynamic responses.

In another approach, authors in J. Kim et al., "Fast and reliable estimation of composite load model parameters using analytical similarity of parameter sensitivity," IEEE Transactions on Power Systems, vol. 31, no. 1, pp. 663-671, January 2016 and K. Zhang, H. Zhu, and S. Guo, "Dependency analysis and improved parameter estimation for dynamic composite load modeling," IEEE Transactions on Power Systems, vol. 32, no. 4, pp. 3287-3297, July 2017, numerically solve the parameter-fitting problem using non-linear least squares estimators. In these methods, the parameter identifiability assessment and dimension reduction are conducted through sensitivity and dependency analysis. Though sensitivity analysis reflects the impacts of the individual parameter on the load dynamics, it fails to capture the mutual dependency between two or more parameters, which has been proved to be of great importance in composite load dynamics, the authors define the parameter dependency as the similarity of their influences on the dynamic response trajectory. Such a dependency analysis still falls short in factoring in the impact of multiple parameters on the load transient dynamics at the same time. In fact, with over one hundred parameters in the WECC CLM, the true interactions among them are hard to fully assess.

However, a detailed WECC CLM model typically has a high degree of complexity, with over one hundred parameters, and no systematic approach to identifying and calibrating these parameters. As such, it is desirable to develop a system and method to efficiently identify parameters for the WECC CLM.

SUMMARY OF DESCRIBED SUBJECT MATTER

The presently disclosed embodiments relate to systems and methods of developing load models and corresponding compositions and parameters for monitoring and analysis of electric power systems.

In some embodiments, the present disclosure provides an exemplary technically improved computer-based load modeling system and method for power systems that include at least the following components/steps of acquiring state information at a bus of the electric power system, acquiring a training event record, and generating the load model by sequentially executing steps of determining a final load component composition for a predetermined composite load model structure referencing to both the state information and the training event record, and determining a plurality of final load parameters corresponding to the final load component composition and the predetermined load model structure also referencing to both the state information and the training event record.

In some embodiments, the present disclosure provides an exemplary technically improved computer-based load modeling system and method that include, in determining the final load component composition, at least the following components/steps of initializing a plurality of load component compositions, optimizing the plurality of the initial load component compositions with a machine learning agent to generate a predetermined number of top load component compositions, calculating quantile loss for each of the top load component compositions with a predefined quantile level, and selecting one of the top load component compositions that has the lowest quantile loss as the final load component composition.

In some embodiments, the present disclosure provides an exemplary technically improved computer-based load modeling system and method that include, in determining the plurality of final load parameters, at least the following components/steps of fixing the final load component composition, generating a plurality of sets of parameter values from predetermined parameter ranges, generating a dynamic response curve for each of the plurality of sets of parameter values, evaluating the generated dynamic response curves in reference to the training event record, and selecting one of the plurality of sets of parameter values for the plurality of final load parameters based on a predetermined criterion.

In some embodiments, the presently disclosed load modeling system measures state information at multiple buses in the power system with multiple PMUs which are synchronized by a common time source such as the GPS.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIGS. 1-27 show one or more schematic flow diagrams, certain computer-based architectures, and/or computer-generated plots which are illustrative of some exemplary aspects of at least some embodiments of the present disclosure.

FIG. 1 shows a detailed load structure for the WECC CLM.

FIG. 2 shows a sensitivity analysis on sample number n against mean fitting loss.

FIG. 3 shows a DDQN agent training process and training environment.

FIG. 4 shows dynamic response value intervals under a load composition at different snapshots.

FIG. 5 shows loss comparison between a reference group and comparison groups.

FIG. 6 illustrates a load modeling system applied to a power system.

FIG. 7 shows a flowchart illustrating a load modeling process in accordance with embodiments of the present disclosure.

FIG. 8 shows a flowchart illustrating an exemplary implementation of stage 1 operation shown as step 740 in FIG. 7.

FIG. 9 shows a flowchart illustrating an exemplary implementation of the optimization process shown as step 820 in FIG. 8.

FIG. 10 shows a flowchart illustrating an exemplary implementation of Stage 2 operation shown as step 750 in FIG. 7.

FIG. 11 shows a flowchart illustrating an exemplary application of the load modeling system in a power system.

FIG. 12 shows a DDQN learning process for a ZIP+IM load model.

FIG. 13 shows a reference P curve and the top three possible solutions.

FIG. 14 shows dynamic response comparison between the reference load and the fitted load.

FIG. 15 shows a DDQN learning process for the WECC CLM.

FIG. 16 shows evolution of load fractions for the six load components over a training process.

FIG. 17 shows a reference P curve and the top three possible solutions.

FIG. 18 shows dynamic response comparison between the reference load and the fitted load.

FIG. 22 shows voltage profile for bus 20 during a FIDVR fault.

DETAILED DESCRIPTION

Figure 1:
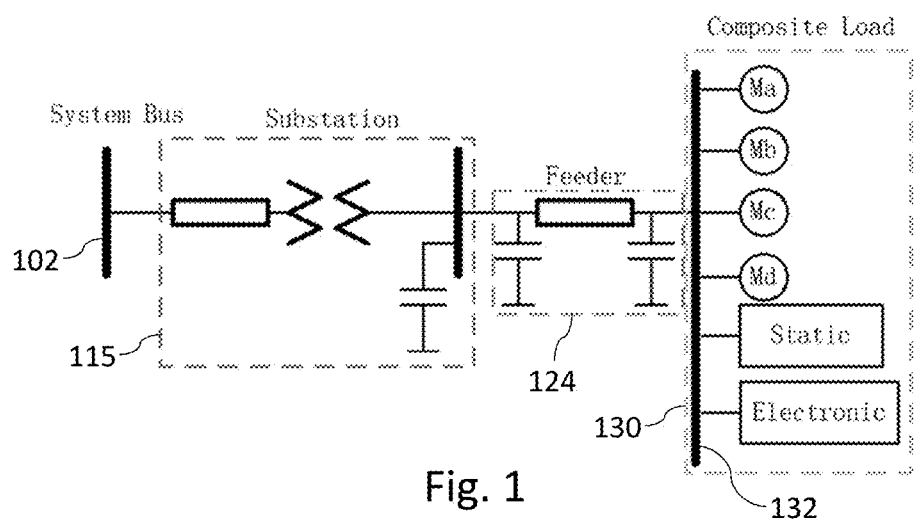

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

FIG. 1 through FIG. 27 illustrate systems and methods of a deep reinforcement learning (DRL) double deep Q-learning network (DDQN)-based, two-stage load modeling and parameter identification framework for various composite load models, including the WECC CLM. The following embodiments provide technical solutions and technical improvements that overcome technical problems, drawbacks and/or deficiencies in the technical fields involving electric power system. As explained in more detail, below, technical solutions and technical improvements herein include aspects of improved load modelling and analysis. Based on such technical features, further technical benefits become available to users and operators of these systems and methods. Moreover, various practical applications of the disclosed technology are also described, which provide further practical benefits to users and operators that are also new and useful improvements in the art.

In the presently disclosed load modeling framework, the DDQN agent serves as an optimization tool to estimate the key parameters in WECC CLM. Similar deep reinforcement learning-based optimization problems have also been discussed before. For instance, in Y. Li, Y. Wen, D. Tao and K. Guan, "Transforming Cooling Optimization for Green Data Center via Deep Reinforcement Learning," IEEE Transactions on Cybernetics. Doi: 10.1109/TCYB.2019.2927410, the authors apply the deep deterministic policy gradient (DDPG) algorithm to determine the values of five control setpoints in the cooling systems to minimize the total data center cooling costs; in M. Schaarschmidt, F. Gessert, V. Dalibard, E. Yoneki, "Learning Runtime Parameters in Computer Systems with Delayed Experience Injection," in 2016 Conference on Neural Information Processing Systems (NIPS), Barcelona, Spain, December 2016, pp. 1-10, the authors use the deep Q-learning network (DQN) to identify the runtime parameter in computer systems to improve the accuracy of the cache expiration time estimation. For the load modeling work on WECC CLM according to embodiments of the present disclosure, rather than directly constructing states for all parameters, the first stage only builds states for the load component fractions. These load component fractions or states serve as the "abstracted features" to characterize the full composite load models. The sequential decision making then relates to assess whether these states can consistently represent the load model for future actions or load fraction changes. The DRL agent thus learns the Q-values for these states to obtain high rewards in the long run. In this way, the identified load component fractions are relatively robust to various conditions, which are another desirable property for load modeling. The remaining parameters, including other top sensitive parameters, are identified in the second stage.

This method adopts the Transient Security Assessment Tools (TSAT) from DSATools as the DDQN agent's training environment, which follows the state-of-art WECC model validation progresses to comply with industry practitioners. As such it is different from most nonlinear least square estimator-based load modeling work. The method recasts the load modeling for the WECC CLM into a two-stage learning problem. In the first stage, a DDQN agent is trained to find a load composition ratio that most likely represents the true dynamic responses at the bus of interest. Then, in the second stage, Monte-Carlo simulations are conducted to select the rest of the load parameters for the load model. From the Monte-Carlo simulations, the one set of parameters that best approximates the true dynamic responses is chosen for the load model. The specification of the WECC CLM indicates that each load component in the model represents the aggregation of a specific type of load. Under such a composite load structure, it has been observed that different load composition ratios could have very similar transient dynamics. Therefore, solving the load composition ratio first and conducting the load parameter identification based on the identified ratio can significantly reduce the problem's complexity and increase load parameter identification computational efficiency. In addition, each parameter is independently selected in stage two through Monte-Carlo simulations, and the parameter identification criterion is to evaluate the dynamic response reconstruction. This method implicitly considers the dependency between two or more parameters. The presently disclosed method offers the following unique features and contributions:

1) A load modeling framework for the WECC CLM with limited prior knowledge to model details. Only the dynamic response curve is required to implement the proposed learning framework.

2) The load model identified by this framework is robust to various contingencies. The fitted load model is verified to be effective to recover the true dynamics with different fault locations, fault types and fault durations.

3) The proposed method is scalable to different composite load structures: In the DDQN training environment, the action taken by the agent is designed to be the load fraction changes on different load types. This set up allows the proposed method to be scaled from conventional CLM load models such as ZIP+IM to larger load models like the WECC CLM. The method can be easily extended when WECC CLM is updated with new load components, such as distributed energy resources (DERs).

4) Applicable with limited data scenario: Unlike other data-hungry supervised and unsupervised machine learning methods, our DDQN approach only needs a few sets of transient records to conduct load modeling, which effectively overcome the data availability issue.

I. WECC CLM Introduction

A. WECC CLM Structure

The WECC CLM is widely recognized as the state-of-the-art load model due its robustness in modeling a variety of load compositions and its capability of simulating the electrical distance between the end-users and the transmission substations.

FIG. 1 illustrates a detailed load structure for the WECC CLM, which includes a substation 115, a feeder 124, and a load 130. The substation 115 is connected to a system bus 102. The feeder 124 connects the substation 115 to the load 130. Parameters for the substation 115 and the feeder 124 parts, such as the substation shunt capacitance $B_{SS}$ and transformer tap settings usually follow the industry convention and do not have significant variance. In embodiments of present disclosure, the feeder 124 and substation 115 parameters are set to follow industrial standard values. The load 130 in WECC CLM includes three three-phase induction motors (Ma, Mb and Mc), one single-phase induction motors (Md), one electronic load, and one ZIP static load. The modeling work of the present disclosure focuses on the load composition and parameter identification for these load components.

B. Three-Phase Induction Motors

As shown in FIG. 1, the four motors are connected at an end-use bus 132 which is connected to the substation 115 through the feeder 124. Three of them are three-phase induction motors, which are defined as Ma, Mb, and Mc in our system setup. Ma, Mb and Mc use the same fifth-order induction motor model shown from (1)-(9), which are derived from the three-phase motor model block diagram given by WECC:

$$\frac{dE'_q}{dt} = -\frac{1}{T_{p0}}\left[E'_q + (L_s - L_p)i_d\right] - \omega_0 \cdot s \cdot E'_d, \quad (1)$$

$$\frac{dE'_d}{dt} = -\frac{1}{T_{p0}}[E'_d - (L_s - L_p)i_q] + \omega_0 \cdot s \cdot E'_q, \quad (2)$$

$$\frac{dE''_q}{dt} = \left(\frac{1}{T_{pp0}} - \frac{1}{T_{p0}}\right)E'_q - \left(\frac{L_s - L_p}{T_{p0}} + \frac{L_p - L_{pp}}{T_{pp0}}\right)i_d + \quad (3)$$

$$\omega_0 \cdot s \cdot (1 - T_{p0}) \cdot E'_d - \frac{1}{T_{pp0}}E''_q - \omega_0 \cdot s \cdot E''_d,$$

$$\frac{dE''_d}{dt} = \left(\frac{1}{T_{pp0}} - \frac{1}{T_{p0}}\right)E'_d + \left(\frac{L_s - L_p}{T_{p0}} + \frac{L_p - L_{pp}}{T_{pp0}}\right)i_q - \quad (4)$$

$$\omega_0 \cdot s \cdot (1 - T_{p0}) \cdot E'_q - \frac{1}{T_{pp0}}E''_d + \omega_0 \cdot s \cdot E''_q,$$

$$\frac{ds}{dt} = -\frac{E''_d i_d + E''_q i_q - T_{m0}\omega_0^{Etrq}}{2H}, \quad (5)$$

$$i_d = \frac{R_s(V_d - E''_d) + L_{pp}(V_q - E''_q)}{R_s^2 + L_{pp}^2}, \quad (6)$$

$$i_q = \frac{R_s(V_q - E''_q) - L_{pp}(V_d - E''_d)}{R_s^2 + L_{pp}^2}, \quad (7)$$

$$p_{3\phi} = \frac{[R_s(V_d^2 + V_q^2 - V_d E''_d - V_q E''_q) - L_{pp}(V_d E''_q - V_q E''_d)]}{R_s^2 + L_{pp}^2}, \quad (8)$$

$$q_{3\phi} = \frac{L_{pp}(V_d^2 + V_q^2 - V_d E''_d - V_q E''_q) - R_s(V_d E''_q - V_q E''_d)}{R_s^2 + L_{pp}^2}. \quad (9)$$

where $E_q'$ and $E_d'$ are the transient voltages for IM on q-axis and d-axis. $E_q''$ and $E_d''$ represent the sub-transient voltages for IM on q-axis and d-axis. $T_{p0}$ and $T_{pp0}$ refer to the transient open-circuit time constant. $L_s$, $L_p$, and $L_{pp}$ indicate the synchronous reactance, transient reactance, and sub-transient reactance. Stator resistance is denoted by $R_s$.

Each of the three-phase induction motors represents a specific type of dynamic load. Ma indicates the aggregation of the three-phase motor's driving constant torque loads, such as commercial/industrial air conditioner; Mb represents the aggregation of the three-phase motor's driving torque speed-squared loads with high inertia, such as fan motors used in residential and commercial buildings; Mc refers to the aggregation of three-phase motor's driving torque speed-squared loads with low inertia, such as direct-connected pump motors used in commercial buildings. The present disclosure designs a variation range for each parameter based on and assume the true values of these load parameters should fall into this range.

Table I presents part of the designed parameter variation range for Ma, Mb, and Mc. In the first stage of our load modeling framework, which is the load composition identification, the load parameters of each load component are unknown and randomly selected from the designed range.

TABLE I

Parameter Variation Range for Induction Motor

| Parameter | Ma | Mb | Mc |
|---|---|---|---|
| $R_s$ | [0.03, 0.05] | [0.03, 0.05] | [0.03, 0.05] |
| $L_s$ | [1.50, 2.00] | [1.50, 2.00] | [1.50, 2.00] |
| $L_p$ | [0.10, 0.15] | [0.17, 0.22] | [0.17, 0.22] |
| $L_{pp}$ | [0.10, 0.20] | [0.12, 0.15] | [0.12, 0.15] |
| $T_{p0}$ | [0.09, 0.10] | [0.18, 0.22] | [0.18, 0.22] |
| $T_{pp0}$ | [1e−3, 2e−3] | [2e−3, 3e−3] | [2e−3, 3e−3] |
| H | [0.10, 0.20] | [0.25, 1.00] | [0.10, 0.20] |

C. Single-Phase Induction Motor

The single-phase IM Md is developed based on extensive laboratory testing by

WECC, which can model both the protective devices and the compressors. The motor's P and Q consumptions are modeled with exponential characteristics, which are divided into three states as functions of bus voltage. State 1 applies when the bus voltage is higher than the motor compressor breakdown voltage (p.u.): V>$V_{brk}$, as shown in (10) state 2 applies when the bus voltage is in between the motor compressor breakdown voltage and motor compressor stall voltage: $V_{stall} \leq V \leq V_{brk}$, which is shown in (11); and state 3 applies when the bus voltage is lower than the motor compressor stall voltage: $V<V_{stall}$, as shown in (12):

$$\text{state 1:} \begin{cases} p_{1\phi} = p_{0,zip} \\ q_{1\phi} = q_{0,1\phi} + 6 \cdot (V - V_{brk})^2 \end{cases} \quad (10)$$

$$\text{state 2:} \begin{cases} p_{1\phi} = p_{0,1\phi} + 12 \cdot (V_{brk} - V)^{3.2} \\ q_{1\phi} = q_{0,1\phi} + 11 \cdot (V_{brk} - V)^{2.5} \end{cases} \quad (11)$$

$$\text{state 3:} \begin{cases} p_{1\phi} = \dfrac{V^2}{R_{stall}} \\ q_{1\phi} = -\dfrac{V^2}{X_{stall}} \end{cases} \quad (12)$$

where $p_{0,1\varnothing}$ and $q_{0,1\varnothing}$ are initial active and reactive power consumed by the single-phase motor. $R_{stall}$ and $X_{stall}$ are the compressor stalling resistance and reactance, respectively. The compressor motors are classified into two categories depending on if they can restart or not after stalling. The active power $p_{i\varnothing}$ and reactive power $q_{1\varnothing}$ consumed by all the compressor motors before and after stalling are shown in (13) and (14). A denotes the compressor motors that can be restarted, and B marks those that cannot be restarted. In (13), $F_{rst}$ refers to the ratio between motor loads that can restart and the total motor loads. In (14), $V_{rst}$ refers to the restarting voltage threshold for the stalled motors. $f$ $(V>V_{rst})$ is the function of the P, Q recovery rate of the compressor motors that can be restarted.

$$\text{before stalling:} \begin{cases} p_A = p_{1\phi} * F_{rst} \\ q_A = q_{1\phi} * F_{rst} \end{cases} \quad (13)$$

$$\text{after stalling:} \begin{cases} p_{1\phi} = p_A \cdot f(V > V_{rst}) + p_{B,stall} \\ q_{1\phi} = q_A \cdot f(V > V_{rst}) + q_{B,stall} \end{cases} \quad (14)$$

Other than the voltage stalling feature introduced here, the WECC CLM also incorporates a thermal relay feature into the single-phase motor. Md's compressor dynamic model is the same as the three-phase IM as Ma, Mb, and Mc. We design the parameter selection range for Md according to NERC Technical Reference Document ("A Look into load modeling: The composite load model." September 2015, https://gig.lbl.gov/sites/all/files/6b-quint-composite-load-model-data.pdf). The values of some critical parameters such as $V_{stall}$, $V_{rst}$, $V_{brk}$, and $F_{rst}$ are selected from the ranges shown in Table II.

TABLE II

Parameter Variation Range for Single-phase IM

| Parameter | $V_{brk}$ | $V_{rst}$ | $V_{stall}$ | $F_{rst}$ |
|---|---|---|---|---|
| | [0.85, 0.90] | [0.92, 0.96] | [0.55, 0.65] | [0.15, 0.30] |

D. Static Load Model: ZIP

The standard ZIP model is used in the WECC CLM to represent the static load. The corresponding active and reactive power are written in (15)-(17):

$$p_{zip} = p_{0,zip} \cdot \left( p_{1c} \cdot \left(\dfrac{V}{V_o}\right)^2 + p_{2c} \cdot \dfrac{V}{V_o} + p_{3c} \right), \quad (15)$$

$$q_{zip} = q_{0,zip} \cdot \left( q_{1c} \cdot \left(\dfrac{V}{V_o}\right)^2 + q_{2c} \cdot \dfrac{V}{V_o} + q_{3c} \right), \quad (16)$$

$$\begin{cases} p_{1c} + p_{2c} + p_{3c} = 1, (0 \leq p_{1c}, p_{2c}, p_{3c} \leq 1) \\ q_{1c} + q_{2c} + q_{3c} = 1, (0 \leq q_{1c}, q_{2c}, q_{3c} \leq 1) \end{cases} \quad (17)$$

where, $p_{0,zip}$ and $q_{0,zip}$ are the initial active and reactive power consumed by the ZIP load. $p_{1c}$, $p_{2c}$, and $p_{3c}$ are the coefficients for the active power of constant impedance, constant current, and constant power load. $q_{1c}$, $q_{2c}$, and $q_{3c}$ are the coefficients for reactive power of constant impedance, constant current, and constant power load. To model the diversity of ZIP load, the $p_{1c,2c,3c}$ and $q_{1c,2c,3c}$ are set to be random within the boundary shown in (17).

E. Electronic Load

The electronic load model in the WECC CLM aims to simulate the linear load tripping phenomenon of electronics. It is modeled as a conditional linear function of the bus voltage V, as shown from the (18)-(19).

$$fvl = \begin{cases} 1 \\ \dfrac{V - V_{d2}}{V_{d1} - V_{d2}} \\ \dfrac{V_{min} - V_{d2} + frcel \cdot (V - V_{min})}{V_{d1} - V_{d2}} \\ 0 \end{cases} \quad (18)$$

$$p_{elc} = fvl \cdot p_{0,elc}, \quad (19)$$

$$q_{elc} = \tan(\cos^{-1}(pf_{elc})) * p_{elc}. \quad (20)$$

where, $V_{d1}$ represents the voltage threshold at which the electronic load starts to trip, $V_{d2}$ indicates the voltage threshold at which all the electronic load trips, $V_{min}$ tracks the minimum bus voltage during the transient, frcel indicates the fraction of electronic load that can be restarted after a fault is cleared. In (20), $pf_{elc}$ denotes the power factor of electronic load (default as 1), and $p_{0,elc}$ refers to the initial power of electronic load. The parameter variation ranges for electronic load are the shown in Table III.

TABLE III

Parameter Variation Range for Electronic Load

| Parameter | $V_{d1}$ | $V_{d2}$ | $Pf_{elc}$ |
|---|---|---|---|
| | [0.60, 0.70] | [0.50, 0.55] | 1 |

F. Identify the Composition of the Composite Load

In a composite load model, different load composition can induce very similar dynamic responses. It has been observed in S. Guo, T. J. Overbye, "Parameter estimation of a complex load model using phasor measurements," in Proc. Power Energy Conf., Illinois, February 2012, pp. 1-6, that a different load composition of a big IM and a small IM could have very similar load dynamic responses. This multi-solution phenomenon on load composition is even more common in the WECC CLM due to the multiple IMs in place.

The two-stage load modeling system and method of the present disclosure can effectively find near-optimal load compositions in stage one; and then in stage two, the other load parameters can be efficiently identified.

To demonstrate the importance of identifying the load composition before fitting other parameters, we conduct a fitting loss comparison. In this comparison, we first create one set of reference P, Q dynamic curves, and then according to the reference curves, we fit one load composition using our proposed load modeling method. Then, we use the true load composition and generate a random load composition as two comparison groups. We gradually increase the number of sampled load models under these three load compositions from one to one hundred.

Figure 2:
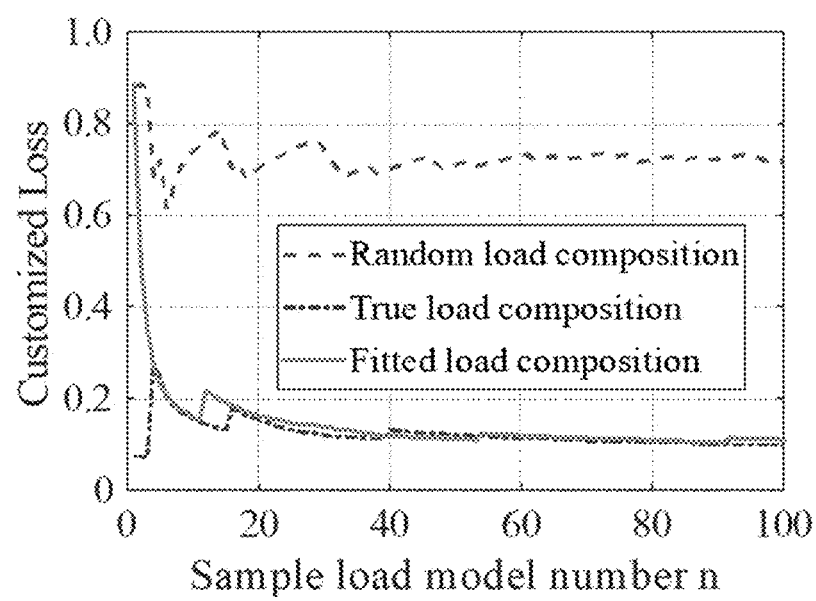

FIG. 2 shows a sensitivity analysis on sample number n against mean fitting loss of these three load compositions. When the sample number is small, the fitting loss of the fitted load composition is similar to the random load composition, and the fitting loss of the true load composition is much lower. However, as the sample number increases, the mean fitting loss of the fitted load composition quickly decreases and eventually merges with the true load composition, but the fitting loss of the random load composition stays high. This comparison justifies the effectiveness of conducting load composition identification before fitting other parameters.

In stage one, a DDQN agent will find multiple high-quality load composition solutions due to their similar dynamic responses. We use pinball loss (or named as quantile loss) as a quantile-based metric to evaluate each load composition according to the produced dynamic response prediction intervals in a probabilistic manner. Just like root mean squared error (RMSE) in the point forecasting, pinball loss, as shown in (21), calculates a value to indicate the accuracy of the generated quantile with the reference values. The lower the loss is, the better the quantile is produced. In (21), $\hat{x}_o$ is the value at quantile o of a group of data, x indicates the value that need to be evaluated, and $\tau$ refers to the penalize factor at the corresponding quantile level. By calculating the mean pinball loss of both the $P_{ref}$ and $Q_{ref}$ within a quantile band $[\underline{\tau}, \overline{\tau}]$ generated by different load compositions, we can rank each load composition in representing the true load dynamics as shown in (22). Where, $P_o^i/Q_o^i$ are the value of $i^{th}$ snapshot of P/Q dynamic response at quantile o under load composition S, $P_{ref}^i/Q_{ref}^i$ show the $i^{th}$ snapshot of P/Q reference dynamic response, $\overline{\tau}$ is the penalize factor for upper bound quantile and $\underline{\tau}$ is the penalize factor for quantile lower bound, N refers to the number of snapshots in the dynamic curves:

$$L_\tau(\hat{x}_o, x) = \max[(\hat{x}_o - x)\cdot\tau, (\hat{x}_o - x)\cdot(\tau - 1)] \quad (21)$$

$$L^{pinball} = \frac{\sum_{i=1}^{N}\left[L_\tau(P_o^i, P_{ref}^i) + L_{\underline{\tau}}(P_{1-o}^i, P_{ref}^i) + L_\tau(Q_o^i, Q_{ref}^i) + L_{\underline{\tau}}(Q_{1-o}^i, Q_{ref}^i)\right]}{N} \quad (22)$$

To get the quantile value under each load composition, transient responses of the WECC CLM models with the same load composition but different remaining parameters are generated.

Figure 4:
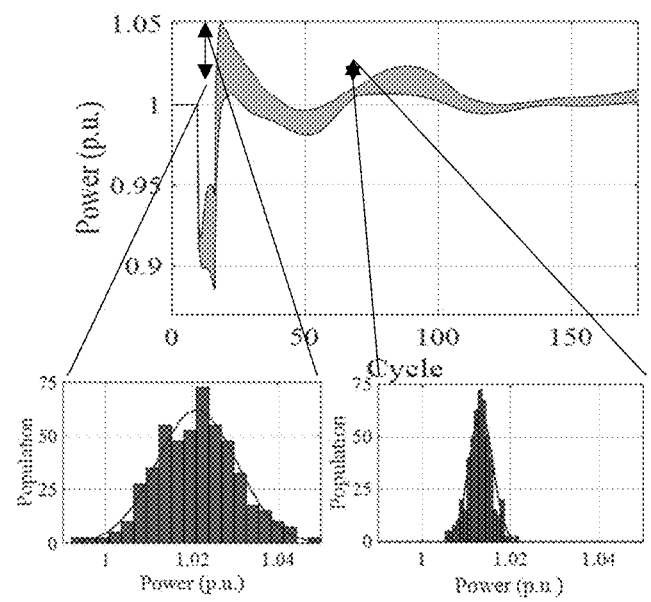

FIG. 4 shows dynamic response value intervals under a load composition at different snapshots as an example to show value intervals of P response under a certain load composition using 500 random cases. These 500 cases are randomly generated by uniformly sampling within the defined parameter boundaries. According to our tests, 500 cases is sufficient to form a representative distribution on the value intervals of each snapshot. The value distributions of two snapshots are presented in FIG. 4.

G. Monte Carlo-Based Parameter Selection

In the last step, the probability of each possible load composition is calculated using (22). Then, from the massive random cases that are used to generate the distributing band as shown in FIG. 4, the set of parameters that best approximates the reference dynamics $P_{ref}$ and $Q_{ref}$ is selected as the load modeling result. The fitting accuracy is measured using RMSE.

II. DDQN-Based Load Composition Identification

A. DDQN Agent Training Setup

In recent years, artificial intelligence (AI) underwent a giant development. Lots of AI techniques are studied and implemented in power system to address the complex control problems, which were hard to be solved using conventional techniques, and load modeling for the WECC CLM is one of them. In embodiments of the present disclosure, the double deep Q-learning network (DDQN) technique is employed to solve this problem. In the DDQN technique two neural network agents are trained to interact with the environment. Agent A is the prediction network that performs the actions to the environment and updates at each training step, and agent B is the target network which provides a target Q value for agent A's updating while agent B is updated at every C steps (C>>1). Compared to the regular DQN algorithm, the DDQN has better training stability as it avoids the positive bias propagation caused by the max function in a Bellman equation. At each state, the environment responds to the taken action. This response is interpreted as reward or penalty. Both agent A and agent B learn the action-reward function Q (s, $\alpha$) by iteratively updating the Q value following (23), which is fundamentally a Bellman equation. In (23), the $Q^A$(s, $\alpha$) and $Q^B$ (s, $\alpha$) denote the Q functions learned by agent A and agent B; s is the current state; $\alpha$ refers to the current action taken by the agent. $\delta$ represents the learning rate, which determines to which extent the newly acquired information overrides the old information. $\gamma$ indicates the discount factor, which essentially determines how much the reinforcement learning agent weights rewards in the long-term future relative to those in the immediate future. r is the immediate reward/penalty by taking action $\alpha$ at state s; s' is the new state transient from s after action $\alpha$ is taken.

$$Q^A(s,\alpha) = (1-\alpha)Q^A(s,\alpha) + \delta\cdot(r + \gamma\cdot\max Q^B(s',\alpha)) \quad (23)$$

Function $Q^A$(s, $\alpha$) updates at every step following (23), but function $Q^B$(s, $\alpha$) updates every C steps (C>>1). In such a way, the temporal difference (TD) error is created, which serves as the optimization target for the agent, as shown in (24).

$$\min(\mathcal{L}) = \|Q^A(s,\alpha) - r - \gamma\cdot\max Q^B(s',\alpha)\| \quad (24)$$

In this application, the state is defined as the load composition fraction of each load component: s=[$f_{ma}$, $f_{mb}$, $f_{mc}$, $f_{1\varnothing}$, $f_{elc}$, $f_{zip}$]. The summation of s is always one to represent the full load. The actions to be taken by the agents are the pair-wise load fraction modification: $\alpha$=[ . . . , $\rho$, . . . , $-\rho$, . . . ]. $\rho$ is the fraction modification value, which is designed as 0.01 in the case study. Each $\alpha_t$ only has two non-zero elements, which are $\rho$ and $-\rho$. In this case, the summation of s is guaranteed to remain one at each step. For the WECC CLM in the embodiments of the present disclosure, there are six load components. Considering the fraction has plus/minus two directions to update, the total number of two-combinations from six elements is $A_6^2=6\times5=30$. The training environment is the IEEE 39-bus system built in the Transient Security Assessment Tool (TSAT) in DSATools™.

Figure 3:
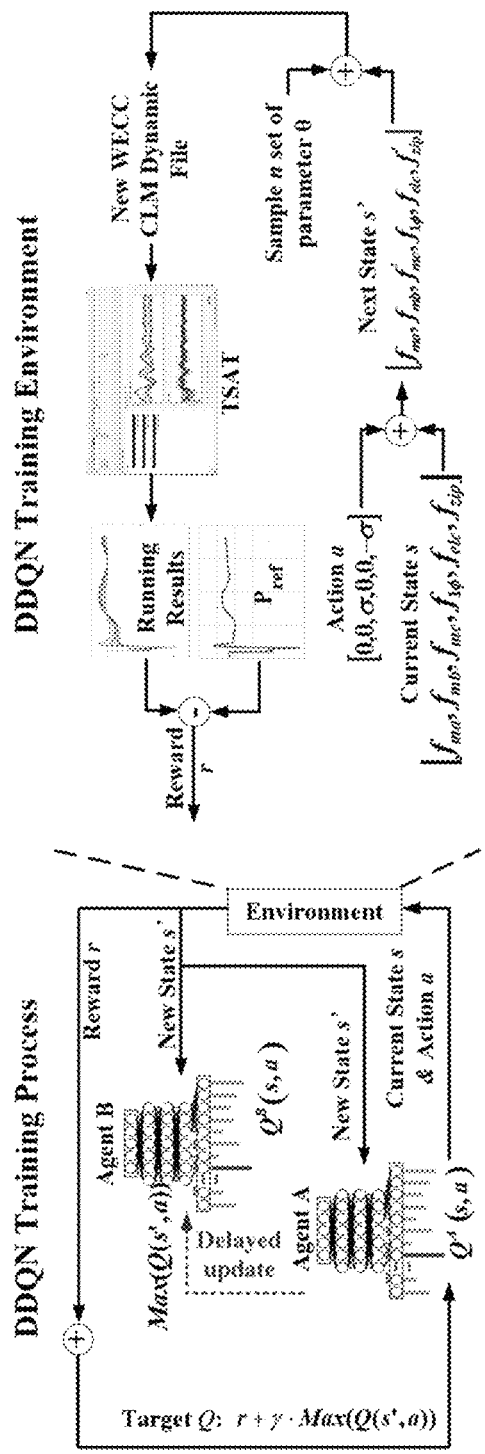

FIG. 3 shows a DDQN agent training process and training environment. Observed from the training environment, when a new state s' is reached, n sets of parameters θ will be sampled, which are then combined with s' to form n dynamic files. The n dynamic files are run in the TSAT in order to calculate the reward. In embodiments of the present disclosure, n is selected as 20 to efficiently identify the good load composition candidates through the sensitivity analysis shown in FIG. 2.

A pseudo-code for the DDQN agent training is shown in Algorithm I below. In the training process the epsilon-greedy searching policy and the memory replay buffer are applied. In embodiments of the present disclosure, the memory buffer size is designed as 2,000.

---

Algorithm I: DDQN Training for WECC CLM

---

Input: Reference dynamic responses $P_{ref}$ and $Q_{ref}$.
Output: Load composition and load parameters
Initialize λ, γ, ε, η, NN. A, NN. B and memory buffer M
For i in range (number of episode)
    s←reset.enviroment( ); ε← ε• η;  r_sum←0;
tik←0; NN. B←NN. A;
    While tik ≤ 80:
        If rand(1) < ε:
            a← a(randi(|30|))
        Else:
            a← a(argmax(NN. A. predict(s)))
        End
        s',r←execute.TSAT(s, a)
        If r>λ
            Terminate Episode i.
        Else
            Step1:        $Q^B(s, a) =$ NN.B.predict(s, a)
            Step2: $Q^A(s) =$ NN.A.predict(s)
            Step3:   $Q^A(s)$(index(a in a)) = $Q^B(s, a) + r$
            Sample a batch of transitions D from M
            Repeat the Step 1 to Step 3 for each sample in D.
            NN. A. fit([s, $s_D$],[$Q^A(s)$, $Q_D$])
            M←[s, a, s', r]
            s ← s'
            r_sum= r_sum+r
        End
    r_list.append(r_sum)
End

---

B. Customized Reward Function

The reward in the embodiments of the present disclosure is a negative value that represents the transient P and Q curve fitting losses. The training goal is to maximize the reward in (25) or equivalently minimize the fitting losses. A higher reward means a higher fitting accuracy. At each new state, the dynamic responses are compared with the reference responses to get a reward r, which will be further interpreted into a Q value to update the agent A and agent B. However, the classic RMSE loss function cannot properly differentiate the desirable load compositions from the undesirable ones. This phenomenon is further explained later. Therefore, a customized loss function is developed to better capture the dynamic features of the transient curves as shown in (25) and (26):

$$r = -\alpha \cdot r_{RMSE} - \beta \cdot r_{trend} - r_{step}. \tag{25}$$

$$r_{trend} = \frac{\sum_{k=1}^{n} |idx_{min}^i - idx_{min}^{ref}| + |idx_{max}^i - idx_{max}^{ref}|}{K} \tag{26}$$

where $r_{RMSE}$ denotes the RMSE between $P_{test}$, $Q_{test}$ and $P_{ref}$, $Q_{ref}$. In equation (25), the regularization term $r_{trend}$ represents the time index mismatch of peak and valley values between $P_{test}$, $Q_{test}$ and $P_{ref}$, $Q_{ref}$. α and β are the weights of term $r_{RMSE}$ and $r_{trend}$. In equation (26), K is a constant that scales down the index mismatch between $P_{test}$, $Q_{test}$ curves and the $P_{ref}$, $Q_{ref}$. $idx_{min/max}^i$ refers to the index of the minimum/maximum value in the $i^{th}$ $P_{test}$, $Q_{test}$, and $idx_{min/max}^{ref}$ indicates the index of the minimum/maximum value of $P_{ref}$, $Q_{ref}$. The values of α, β, and K are tuned so that the value of $-\alpha \cdot r_{RMSE} - \beta \cdot r_{trend} - r_{step}$ is normalized into the range of [−1, 0]. This term explicitly differentiates the desirable fitting results from others and enforces the similar peak and valley timestamps as $P_{ref}$, $Q_{ref}$. Another regularization term r_step is a constant penalty for each step of searching, which facilitates the agent's training speed. Such loss function is fundamentally a similarity-based measure, and this type of metrics is commonly used in load modeling techniques. By using this customized loss function, a generic fitting accuracy threshold λ can then be set as the episode termination condition.

Figure 5:
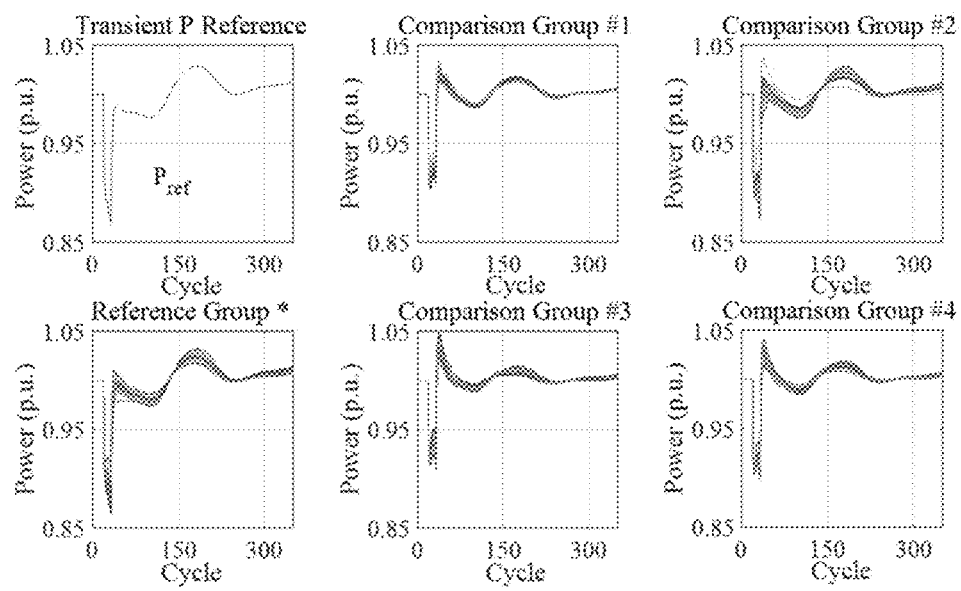

FIG. 5 shows loss comparison between a reference group and comparison groups to illustrate the effects of the customized loss function. In FIG. 5, the $P_{ref}$ is a P dynamic response from a WECC CLM, located at bus 20 of the IEEE 39-bus system, and a three-phase fault is deployed at bus 6. The plots are normalized based on the power flow solution at steady state; Reference Group* shows multiple P dynamic responses from multiple WECC CLMs that have the same load composition as the $P_{ref}$, but with different load parameters. The other four plots are called the comparison groups, where the transient P curves in each plot are generated by the WECC CLMs with a different load composition.

The RMSE and customized loss between the $P_{ref}$ and these five groups are summarized in Table IV. It shows that the RMSEs of the five groups are very close. The boundary between the desirable composition and the undesirable compositions is not clear. Motivated by the aim of load modeling to replicate key features from dynamic responses, we designed our customized loss function to better differentiate the good composition from the less good ones. In this case, it is difficult to derive a generic threshold λ for the DDQN algorithm that is applicable to all cases. On the contrary, by using the customized loss function, the fitting loss discrepancy between the Reference Group* and other groups are significantly enlarged as shown in Table IV. As a result, a generic and fixed λ can be defined to serve as the termination condition for each episode of training.

TABLE IV

Parameter Variation Range for Electronic Load

| | Reference Group* | Group 1 | Group 2 | Group 3 | Group 4 |
|---|---|---|---|---|---|
| RMSE | 0.0136 | 0.0353 | 0.0205 | 0.0413 | 0.0338 |
| Customized Loss | −0.0078 | −0.9596 | −0.1702 | −0.9996 | −0.7206 |

III. Load Modeling Process

FIG. 6 through FIG. 11 illustrate processes of two stage composite load modeling for power systems. The following embodiments provide technical solutions and/or technical improvements that overcome technical problems, drawbacks and/or deficiencies in the technical fields involving power system load modeling. As explained in more detail, below, technical solutions and/or technical improvements herein include aspects of improved identification of load component composition and generation of load model parameters. Based on such technical features, further technical benefits become available to users and operators of these systems and methods. Moreover, various practical applications of the disclosed technology are also described, which provide further practical benefits to users and operators that are also new and useful improvements in the art.

Figure 6:
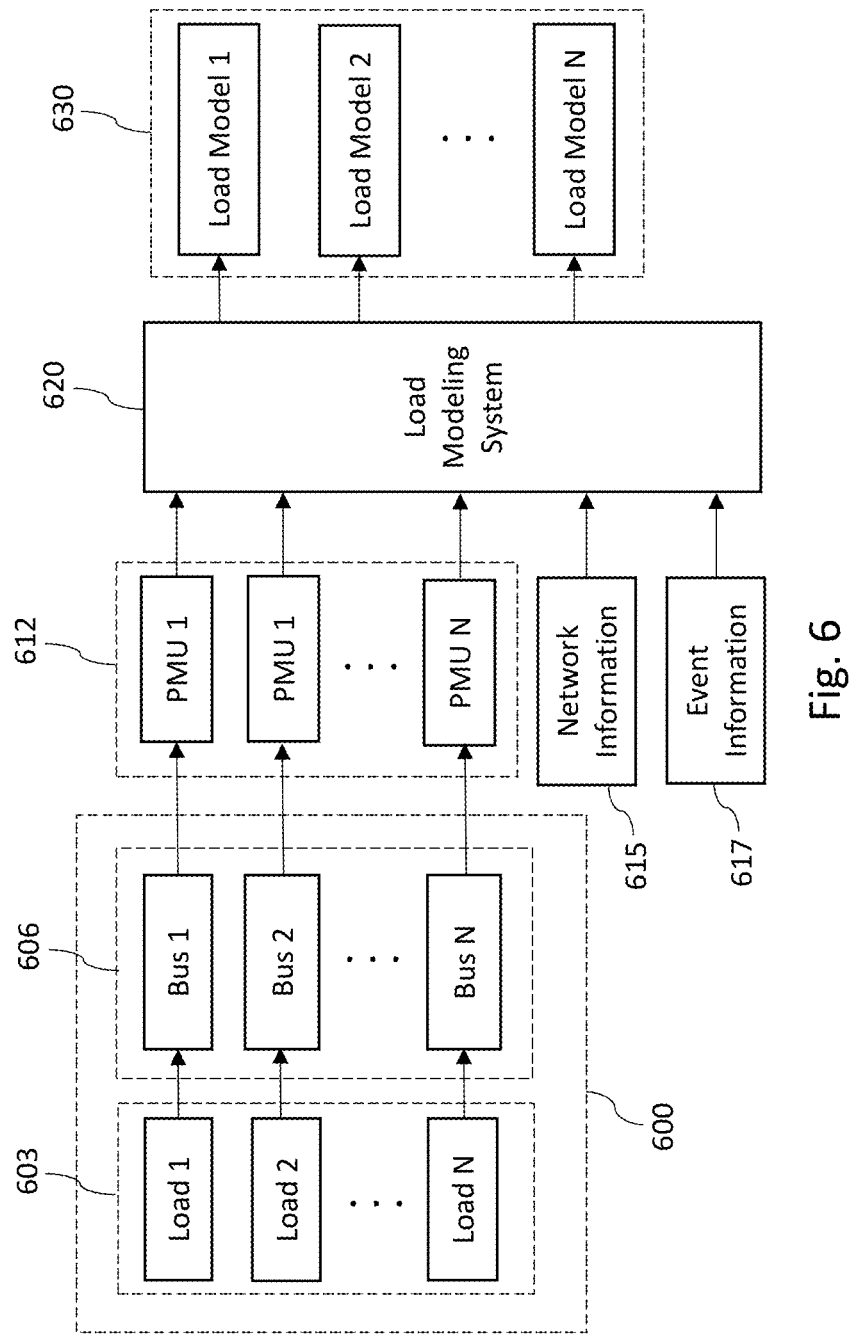

FIG. 6 illustrates a load modeling system applied to a power system 600 which includes a plurality of loads 603 connected to a plurality of buses 606. Load in general refers to an electrical components or portion of a circuit that consumes electric power. In embodiments of the present disclosure, each of the plurality of loads 603 specifically refers to an electric demand at a power grid bus. Each of the plurality of the buses 606 refers to a power network node. Each power generation source and each load should be connected to a bus. Transmission lines are used to connect buses.

Referring again to FIG. 6, a plurality of phasor measurement units (PMU) 612 is connected to the plurality of buses 606 for measuring and estimating the magnitude and phase angle of an electrical phasor quantity (such as voltage or current) at a corresponding one of the plurality of buses 606. The measurements at the plurality of PMU 612 are synchronized by a common time source usually provided by the GPS. With such a system, synchronized real-time measurements of multiple remote points on a power grid becomes possible.

Referring again to FIG. 6, data acquired by the plurality of PMUs 612 are provided to a load modeling system 620 for generating a plurality of load models 630 for the power system 600. Each of the plurality of the load models 630 corresponds to one of the plurality of buses 606. The load modeling system 620 also receives network information 615 and event information 617 for the model generating processes. The network information 615 include a topology of the power network, and current, voltage, real power and reactive power situation and the states of generators. The event information 617 includes, for instance, electricity demand and training event records. The training event records can be used to provide corresponding event type, voltage, real power and reactive power data as references for estimating load parameters of the plurality of load models 630 by the load modeling system 620. Both the network information 615 and the event information 617 may be stored in a database.

The load modeling system 620 may be software instructions including computer executable code located within a memory device that is operable in conjunction with appropriate hardware such as a processor and interface devices to implement the programmed instructions. The programmed instructions may, for instance, include one or more logical blocks of computer instructions, which may be organized as a routine, program, library, object, component and data structure, etc., that performs one or more tasks or performs desired data transformations.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, Software modules or components may be located in local and/or remote memory storage devices. In addition, data being tied or rendered together in a database record may be resident in the same memory device, or across several memory devices, and may be linked together in fields of a record in a database across a network.

Figure 7:
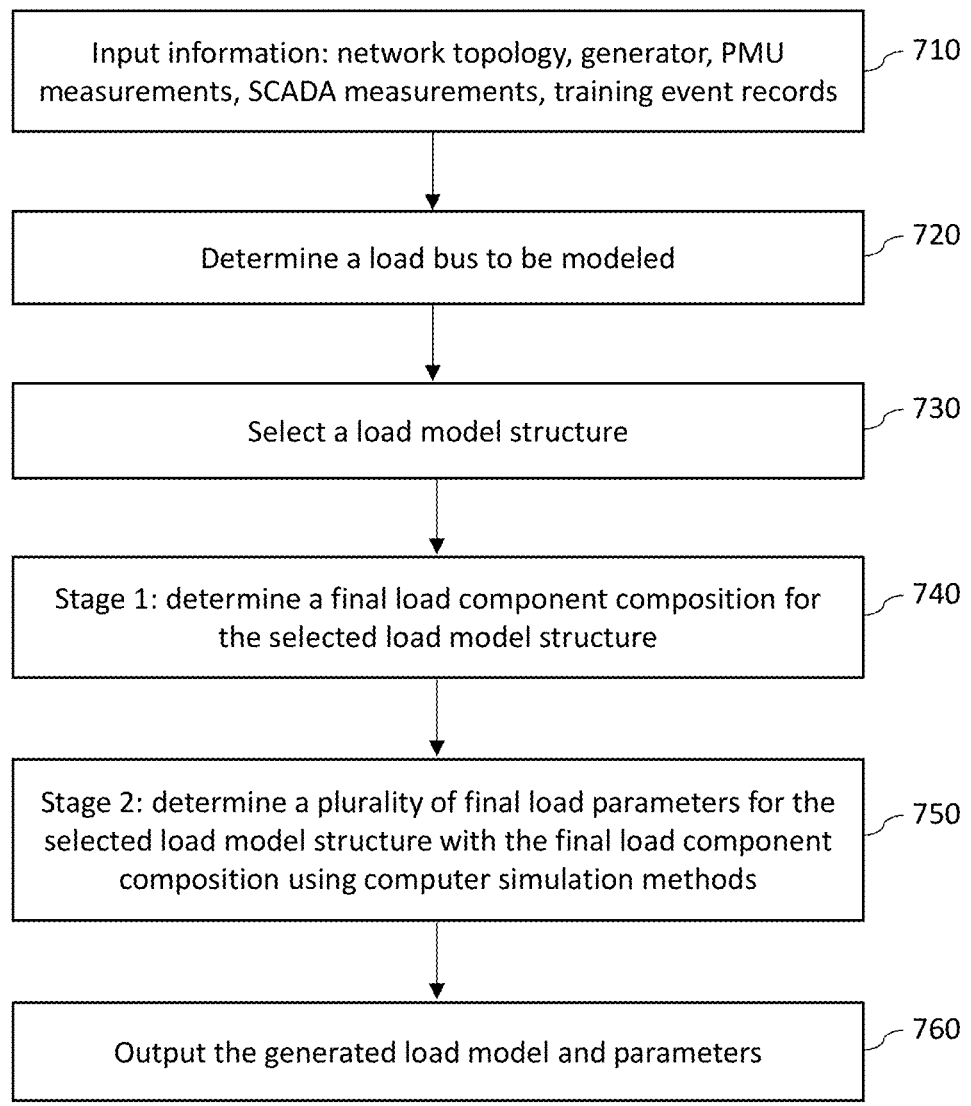

FIG. 7 shows a flowchart illustrating a load modeling process in accordance with embodiments of the present disclosure. The load modeling process begins with step 710 in which input information is acquired from various sources such as PMUs, supervisory control and data acquisition (SCADA) systems and databases that store network information 615 and event information 617 in references to FIG. 6.

In step 720, the load modeling system determines a load bus to be modeled. Such determination may be controlled by a system operator or enacted based on preset conditions such as a volume of the electricity demand on the load bus and/or location of the load bus. In embodiments, the load modeling system may automatically model all the available buses sequentially or simultaneously using the same process and algorithms described hereinbelow.

In step 730, the load modeling system selects a load model structure from a pool of preselected models. In embodiments, the pool of preselected models includes WECC CLM and ZIP+IM. In WECC CLM, there are six load types: ZIP, electronic, motor A, motor B, motor C and motor D. In ZIP+IM, there are only two load types: ZIP and IM. The selection process may be based on electricity demand information acquired through usage survey or past experiences, industry/residential/commercial customer ratio, and/or computational limitations.

In step 740, the load modeling system determines a final load component composition for the selected composite load model structure in Stage 1 operation. In an embodiment, when the selected load model structure is ZIP+IM, the load modeling system determines the percentages of ZIP type load and IM type load. In another embodiment, when the selected load model structure is WECC CLM, the load modeling system determines the percentages of ZIP type load, electronic type load, motor A type load, motor B type load, motor C type load and motor D type load.

In step 750, the load modeling system determines a plurality of final load parameters for the selected load model structure with the final load component composition determined in Stage 1 using computer simulations in Stage 2 operation. In determining the final load parameters, the inputted measurement data from PMUs and SCADA are based to curve fitting the inputted training event records as references. In one embodiment, Monte-Carlo simulation is exemplarily used in determining the final load parameters.

In step 760, the load modeling system outputs the load model and associated parameters generated through steps 710-750 to a computer user interface as well as a database. In embodiments, the same process may be reapplied to other load buses to generate corresponding models with associated load component composition and load parameters if needed. Then the generated load models can be used to run stability analysis, contingency analysis and planning analysis for the power grid which will lead to better decision making for an economic and reliable power grid.

Figure 8:
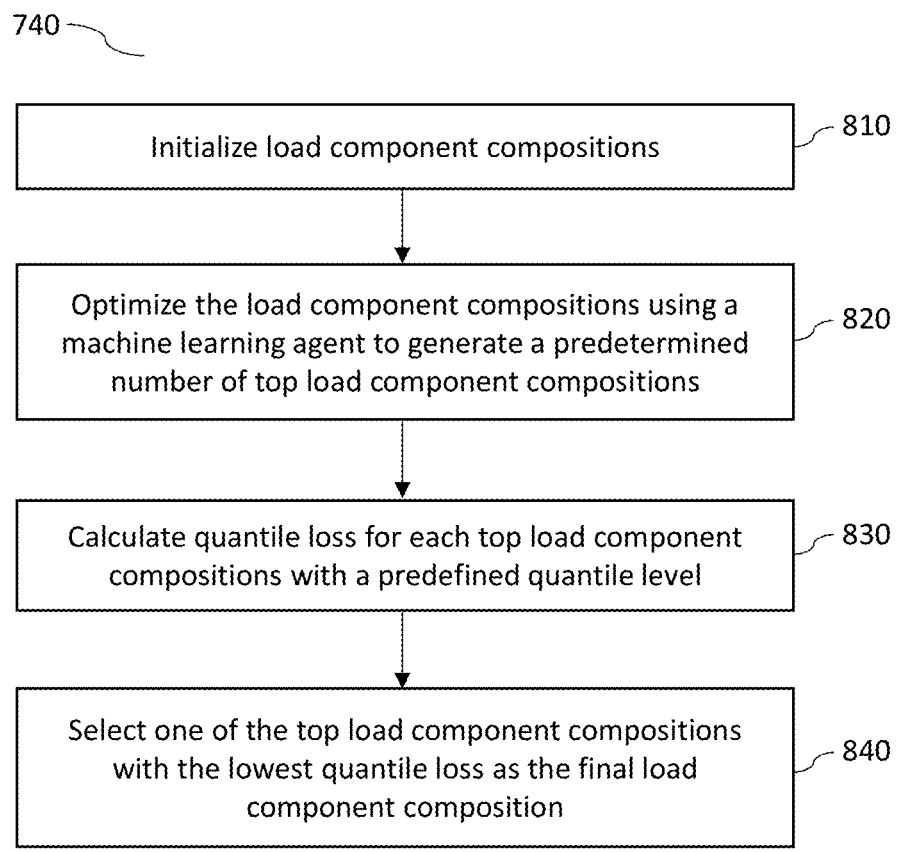

FIG. 8 shows a flowchart illustrating an exemplary implementation of Stage 1 operation shown as step 740 in FIG. 7. The implementation begins with step 810 in which load component compositions for a selected composite load model structure are initialized. In an embodiment, when the selected load model structure is ZIP+IM, the initialization may set 50% for the ZIP type load, and 50% for the IM type load. In another embodiment, when the selected composite load model structure is WECC CLM, the initialization may set 1/6 for each load type of ZIP, electronics, motor A, motor B, motor C and motor D.

In step 820, the load modeling system optimizes the load component compositions using a machine learning agent with the inputted training event record as a guide. In an embodiment, the machine learning agent is a deep reinforcement learning (DRL) agent which uses equation (25) to estimate how good the load component compositions are. In equation (25), there are three terms: RMSE, trend and step. RMSE is used as an indication of how close the fitted curve with an estimated load model. Trend means whether the maximum point and the minimum point from the training event record's reference curve have been captured by the fitted curve. Step means how fast the calculation is converged. These three terms are combined to evaluate how optimal the current load component composition is.

Then the load modeling system identifies top load component compositions based on the above optimization procedures in step 820. As the power grid system modeling requires very complicated optimization procedure, directly obtaining a single global optimal solution is often time unpractical. In the embodiment where DRL agent is used, multiple local optimal candidates can be identified. An exact number of top load component composition candidates is predetermined, for instance to be five. Although not globally optimal, these local optimal candidates can satisfy the needs for the load modeling as the optimization procedures ensure the quality of these candidates.

In step 830, the load modeling system calculates the quantile loss for each of the top load component compositions with a predefined quantile level. For each top load component composition, this quantile loss probabilistically evaluates how close this composition to the original reference event record. In an embodiment, equation (21) is used for the calculation.

In step 840, the load modeling system selects one of the top load component compositions that has the lowest quantile loss as the final load component composition. In an embodiment, equation (22) is used to evaluate the quantile loss and select a candidate with the lowest quantile loss value as the final one. Then the final load component composition will be an output of stage 1 operation which will be used as an input for stage 2 operation.

Figure 9:
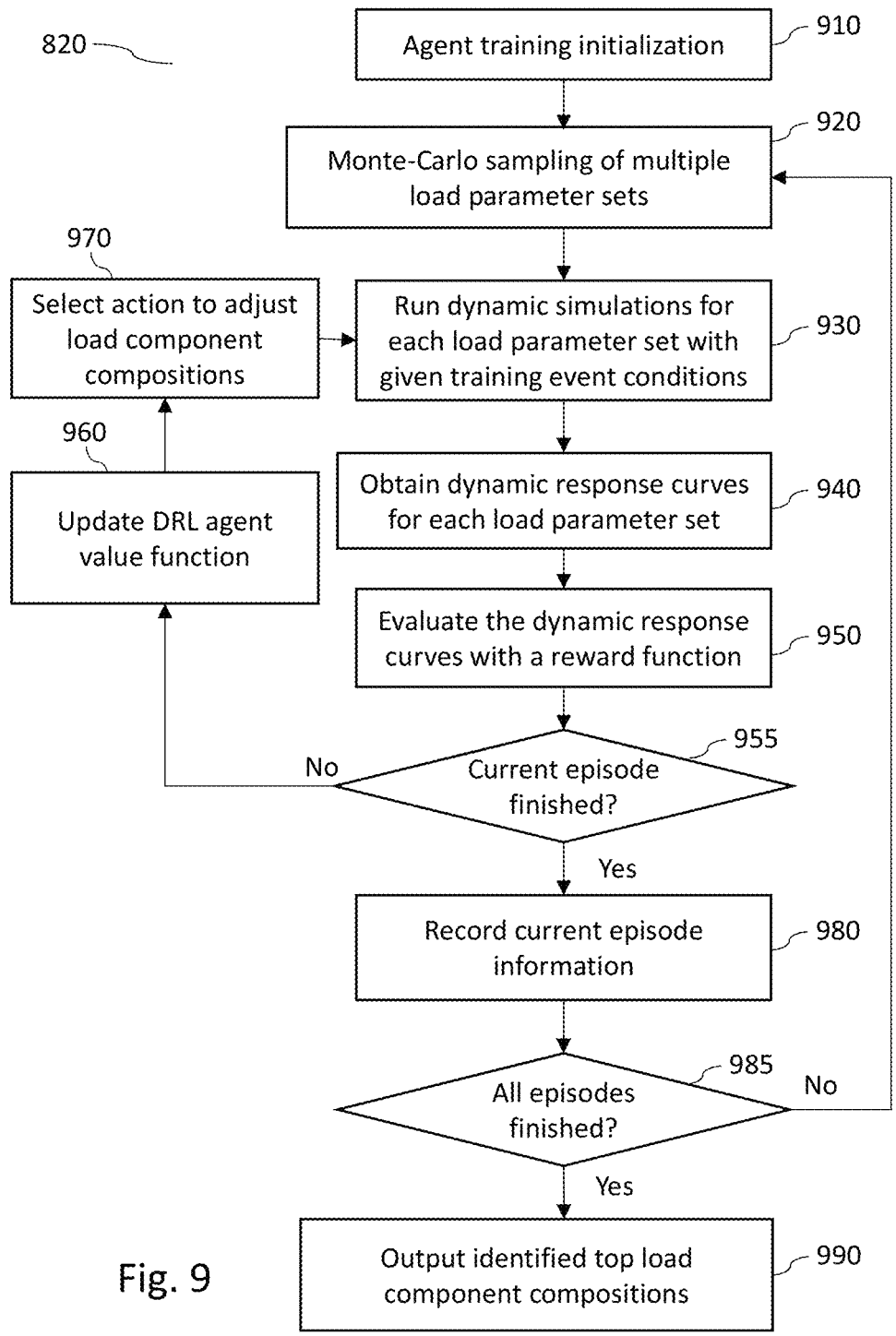

FIG. 9 shows a flowchart illustrating an exemplary implementation of the optimization process shown as steps 820 in FIG. 8. The exemplary implementation uses a DRL agent to perform the optimization process. Step 910 is an agent training initialization step, in which hyperparameters such as $\alpha$ and $\beta$ in equation (25) are given and set to certain values. The hyperparameters are not to be optimized in the load modeling process.

In step 920, Monte-Carlo samples are produced by randomly sampling each component parameter set within the range shown in above Tables I-III. The Monte-Carlo samples are used to evaluate a current load component composition. For a load component composition identified in Stage 1 shown as step 740 in FIG. 7, a large number of parameter sets for this particular composition will be generated.

In step 930, the load modeling system runs dynamic simulations for each parameter set with reference conditions from the inputted training event record.

In step 940, dynamic response curves are obtained for each parameter set. The dynamic response curves are then evaluated with reward function using equation (23) in step 950.

In step 955, the load modeling system detects if a current episode is finished. If not, the load modeling system updates DRL agent value function in step 960, selects actions to adjust load component compositions in step 970 and then enters step 930 in a loop operation. In step 960, the DRL agent value function is used to tell the agent how to make proper adjustment. This value function can be viewed as an algorithmic guide to optimize the load component composition. In the adjustment process of step 970, the DRL agent determines which load component composition to increase or decrease and to what extent. For example, after one loop for WECC CLM, the DRL agent determines to increase ZIP's composition by 5% and decrease motor A's and motor C's composition by 2% and 3%, respectively.

If the current episode is finished, the load modeling system records current episode information in step 980 and detects if all episodes are finished in step 985. If not, the load modeling system returns to step 920 in a loop operation. If all episodes are finished, the load modeling system outputs the identified top load component compositions in step 990—then step 820 of FIG. 8 is complete.

Figure 10:
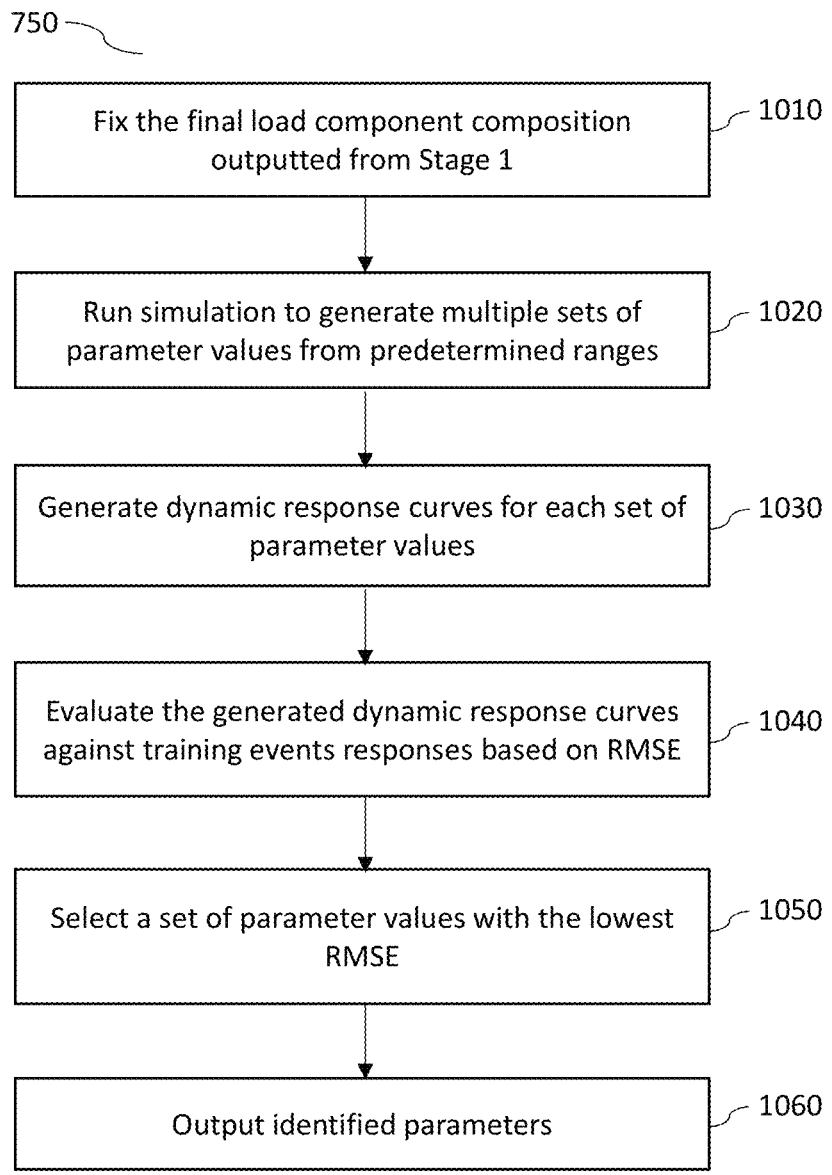

FIG. 10 shows a flowchart illustrating an exemplary implementation of Stage 2 operation shown as step 750 in FIG. 7. The implementation fixes, in step 1010, the final load component composition outputted from Stage 1 shown as step 740 in FIG. 7. In step 1020, a computer simulation method is used to generate multiple sets of parameter values from predetermined ranges thereof. In an embodiment, Monte Carlo sampling is used as the computer simulation method. In order to produce Monte-Carlo samples, each component parameter is randomly sampled within the range as shown in Table I-III, which are exemplarily collected from the public reports published by North American Electric Reliability Corporation (NERC) and Pacific Northwest National Laboratory (PNNL).

In step 1030, for each set of parameter values, dynamic response curves are generated. Then these dynamic responses curves are evaluated against responses produced from the training event record based on RMSE in step 1040.

In step 1050, a set of parameter values with the lowest RMSE is selected and outputted, in step 1060, as the identified parameters.

Figure 11:
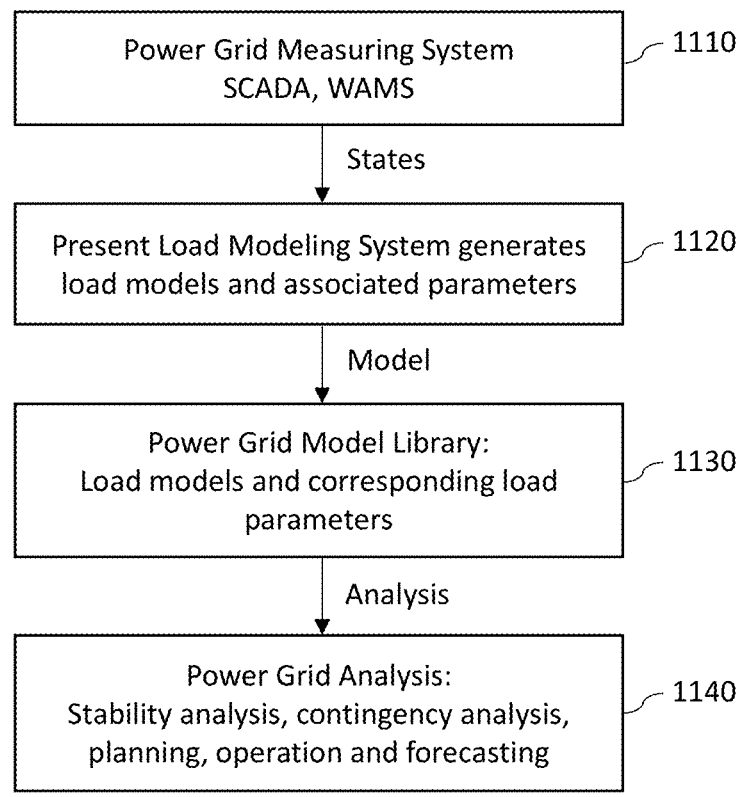

FIG. 11 shows a flowchart illustrating an exemplary application of the load modeling system in a power system. The application begins with step 1110 in which power grid measuring systems such as SCADA and wide area measurement system (WAMS) extract current states of the power system, which is then inputted to the load modeling system of the present disclosure. The states refer to the power grid operation conditions including the network topology, the current, voltage, real power and reactive power situation and whether there is training event records, etc. The data will be stored in the database.

In step 1120, the load modeling system of the present disclosure uses the states to generate load models and associated load parameters which are stored in a power grid model library in step 1130. In step 1140, the generated load models and the associated load parameters are used for power grid analysis by other software applications including stability analysis, contingency analysis, planning, operation and forecasting of power usages. The stability analysis also includes evaluating the power grid economics and reliability.

IV. Case Studies

A. Test Environment

The transient stability test cases shown in this section are conducted in IEEE 39-bus system. In each case study, the base contingency is chosen as a three-phase fault occurred at bus 6, and the load model to be identified is located at bus 20. All the cases are performed using the Transient Security Assessment Tool (TSAT) in DSATools™ developed by Powertech Labs Inc.

B. Case I: Algorithm Test on CLM with ZIP+IM

In Case I, the performance of the proposed algorithm is tested on the conventional ZIP+IM composite load model (CLM). For the DDQN agent, the state vector s indicates the composition of the two load types $s=[s_{zip}, s_{IM}]^T$, ($s_{zip}+s_{IM}=1$). Since there are only two load components to be identified, the action space only contains two actions, which are $$a = [a_1, a_2]^T = \begin{bmatrix} 0.01 & -0.01 \\ -0.01 & 0.01 \end{bmatrix}.$$

Figure 12:
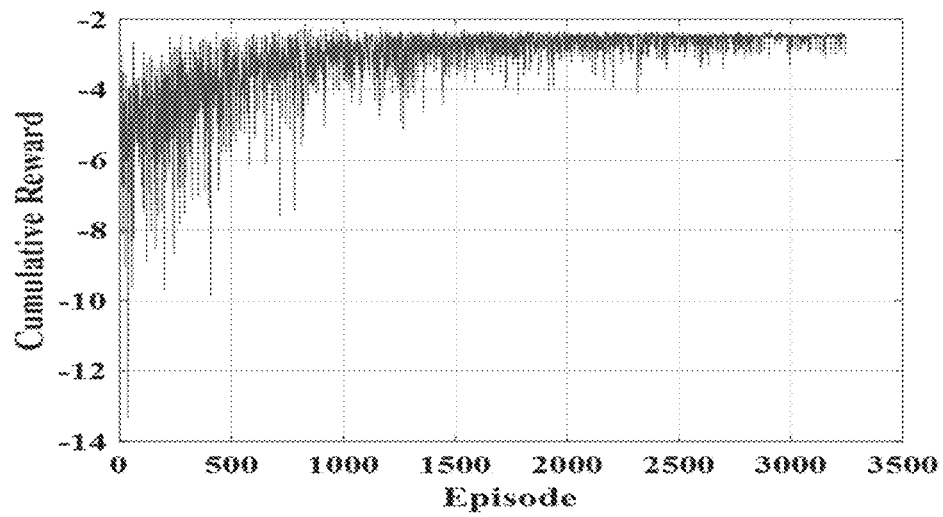
Figure 13:
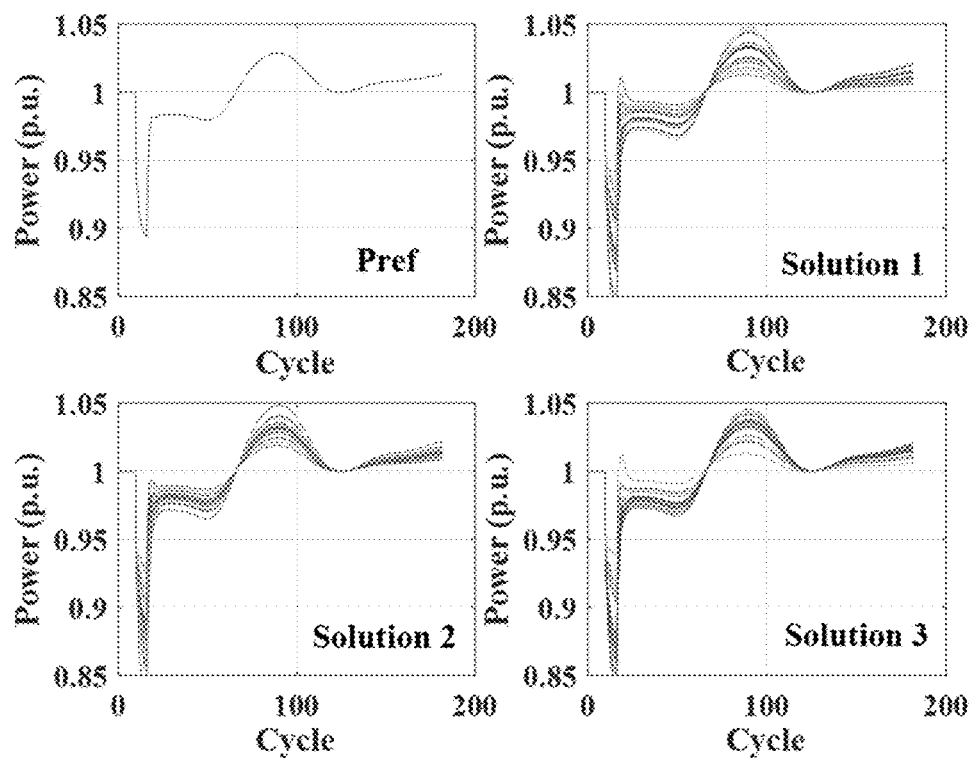

The reference load composition is $s_{ref}=[0.2937, 0.7063]^T$. The DDQN agent starts to search for possible solutions from a randomly generated load composition [0.4935, 0.5065]. The agent training process is shown in FIG. 12. The training reward converges after around 2,000 episodes. The top 3 most possible solutions selected by the trained DDQN agent are listed in Table V and their corresponding P dynamic responses are plotted in FIG. 13. All the three solutions found by the agent have very similar dynamic responses with the actual load model.

The prediction intervals of the three solutions are calculated using pinball loss with quantile interval as 70% coverage at [15%, 85%], 80% coverage at [10%, 90%], and 90% coverage at [5%, 95%]. The results are also listed in Table V. Among the three solutions, solution 2 has consistently achieved the lowest pinball loss for all the three quantile intervals. Therefore, it is selected as the load composition identification solution: $S=[0.2935, 0.7065]^T$.

TABLE V

Candidate Load Composition

|  |  | True | Solution 1 | Solution 2 | Solution 3 |
|---|---|---|---|---|---|
| ZIP |  | 0.2937 | 0.2835 | 0.2935 | 0.3035 |
| IM |  | 0.7063 | 0.7165 | 0.7065 | 0.6965 |
| Pinball Loss | [15%, 85%] |  | 0.0306 | 0.0286 | 0.0338 |
|  | [10%, 90%] |  | 0.0295 | 0.0273 | 0.0328 |
|  | [5%, 95%] |  | 0.0295 | 0.0269 | 0.0331 |

Figure 14:
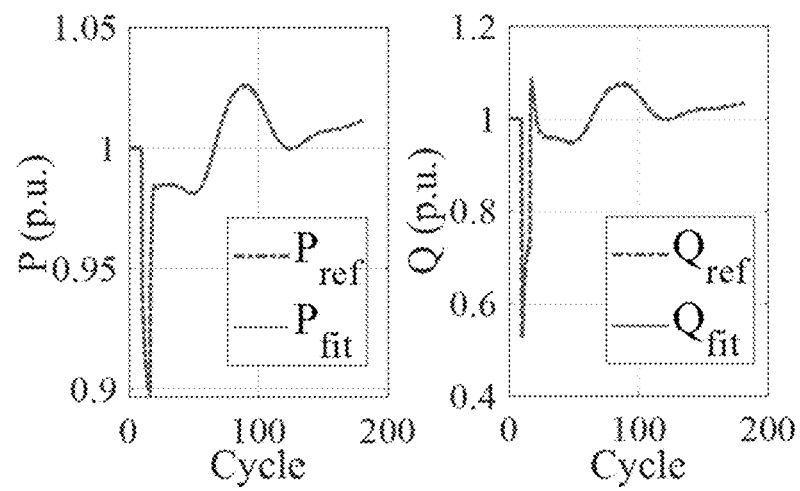

Based on the solution, 500 Monte Carlo samplings are conducted on the load parameters. The one set of parameters, yielding the lowest dynamic response reconstruction error, is selected as the identified load parameters. The reference load parameters and the identified load parameters are shown in Table VI. Except $P_{1c}$ and $P_{2c}$, all the other parameters are well fitted. The P and Q transient dynamic response comparisons between the reference model and the identified model are shown in FIG. 14. The active power P fitting RMSE is 0.0692% and the reactive power Q fitting RMSE is 0.68%.

TABLE VI

Candidate Load Composition

|  | $R_s$ | $L_s$ | $L_p$ | $L_{pp}$ | $T_{p0}$ | $T_{pp0}$ |
|---|---|---|---|---|---|---|
| Ref | 0.0314 | 1.9013 | 0.1228 | 0.1040 | 0.0950 | 0.0021 |
| Fit | 0.0327 | 1.8558 | 0.1328 | 0.1032 | 0.0938 | 0.0021 |

|  | H | Etrq | $P_{1C}$ | $P_{2C}$ | $Q_{1C}$ | $Q_{2C}$ |
|---|---|---|---|---|---|---|
| Ref | 0.1000 | 0 | 0.0316 | 0.6947 | −0.4769 | 1.4769 |
| Fit | 0.1030 | 0 | 0.0274 | 0.2287 | −0.4477 | 1.4477 |

C. Case II: Algorithm Test on WECC CLM

In this case, the proposed DDQN-based load composition identification strategy is applied to the WECC CLM. Compared with Case I, the number of load component in the WECC CLM increases from two to six. Therefore, the state vector size turns into 6×1. The number of actions can be taken by the agent also increases to APO. The action step size is 0.01, which means the load composition changes 1% at each step. This case study aims to demonstrate that the proposed method is scalable to larger load models.

Figure 15:
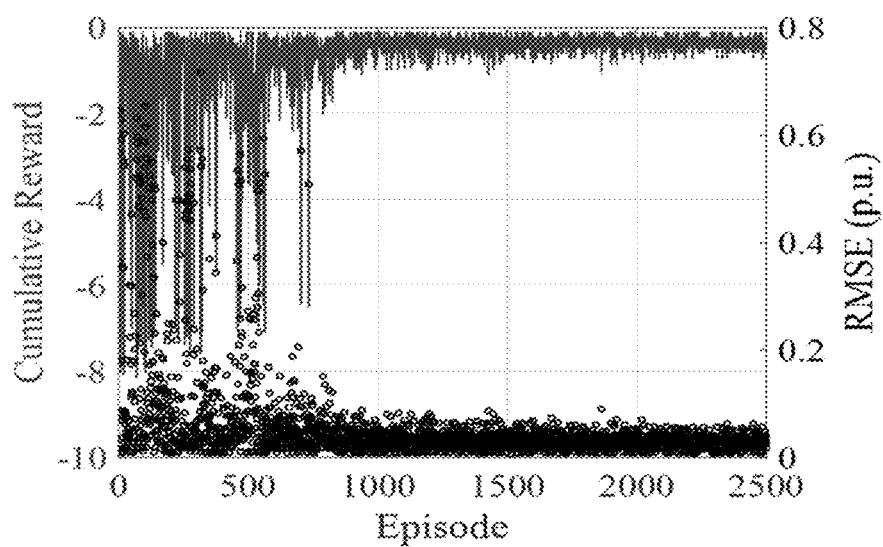
Figure 16:
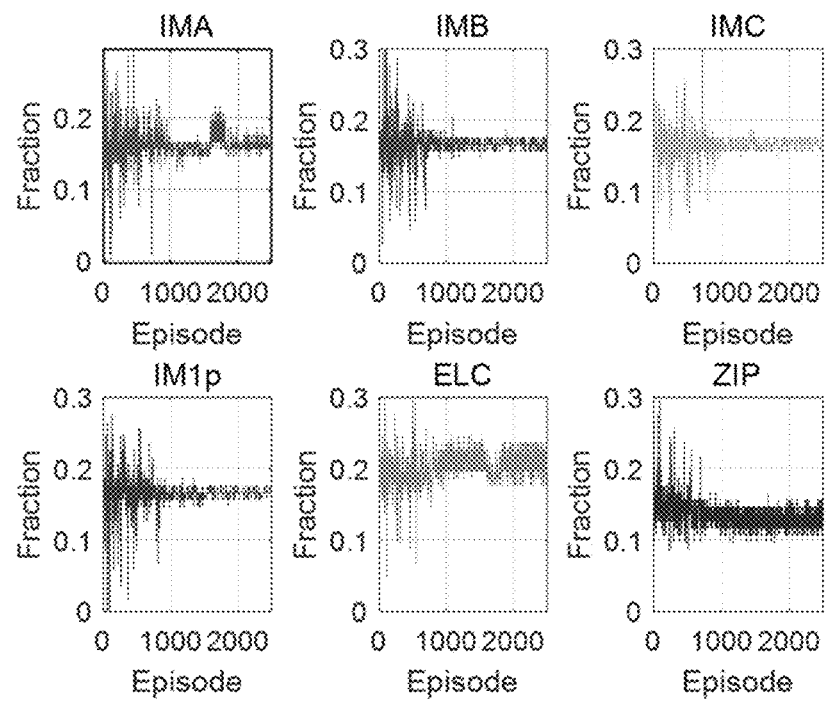
Figure 17:
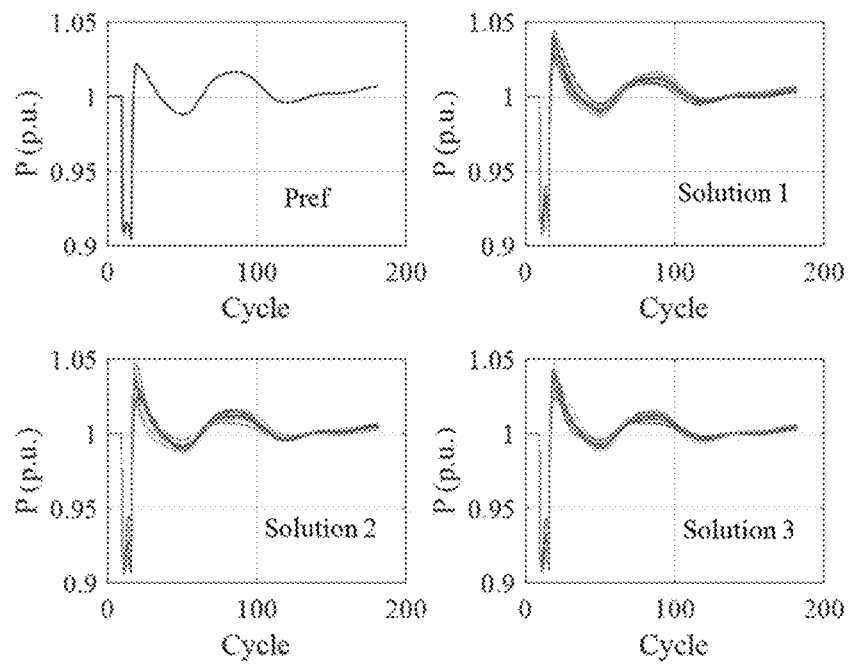

The reference load composition is $s_{WECC}=[0.3637, 0.1430, 0.0914, 0.1526, 0.1088, 0.1405]^T$. The training starting state is defined as $[1/6, 1/6, 1/6, 1/6, 1/6, 1/6]^T$. The training reward converges after 900 episodes as shown in FIG. 15. The scatter plot in FIG. 15 shows the summation of P and Q fitting RMSE at each training episode, which converges at the same pace with the cumulative reward. The fraction evolutions of the six load components are also plotted in FIG. 16. It shows that at the beginning of the training process, the DDQN agent actively explores the state space and leads to a large search variance for each load component. As the training proceeds, the searching range of the DDQN agent becomes more concentrated and eventually converges to finish the exploitation. This figure verifies the strong exploration and exploitation capabilities of the proposed approach. The top three most possible solutions given by the agent are listed in Table VII and their corresponding P dynamic responses are plotted in FIG. 17.

TABLE VII

Candidate Load Composition

|  |  | True | Solution 1 | Solution 2 | Solution 3 |
|---|---|---|---|---|---|
| IM_A |  | 0.3637 | 0.1667 | 0.1667 | 0.1767 |
| IM_B |  | 0.1430 | 0.1667 | 0.1567 | 0.1567 |
| IM_C |  | 0.0914 | 0.1667 | 0.1667 | 0.1667 |
| IM_1p |  | 0.1526 | 0.1667 | 0.1767 | 0.1567 |
| ELC |  | 0.1088 | 0.2067 | 0.2167 | 0.2267 |
| ZIP |  | 0.1405 | 0.1267 | 0.1167 | 0.1167 |
| Dynamic |  | 0.7507 | 0.6667 | 0.6667 | 0.6566 |
| Static |  | 0.2493 | 0.3333 | 0.3333 | 0.3434 |
| Pinball | [0.15, 0.85] |  | 0.0143 | 0.0153 | 0.0222 |
| Loss | [0.10, 0.90] |  | 0.0136 | 0.0147 | 0.0185 |
|  | [0.05, 0.95] |  | 0.0131 | 0.0140 | 0.0162 |

Figure 18:
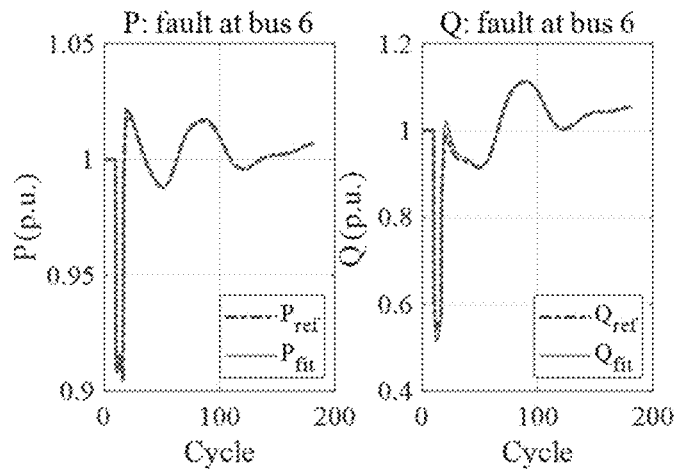

Unlike the conventional CLM with only one IM, the WECC CLM has three TMs and one single-phase IM; therefore, the transient dynamics between each load component has more mutual interference. For each transient event, there exist multiple load composition solutions with very similar transient dynamics. As shown in Table VII, the top three most possible solutions are listed. For those three solutions, the load distribution among dynamic loads and static loads are close to the reference load model. During the training process, the DDQN agent gradually learns to choose solutions with lower fitting quantile loss; in other words, a more stable solution emerges so that each episode is terminated with fewer exploration steps. According to the lowest pinball loss at different percentile intervals, solution 1 is chosen as the load composition solution. Based on this result, 500 Monte-Carlo samplings are conducted to select a set of parameters that best match with the reference P and Q. The best fitting result is shown in FIG. 18. Due to space limitation, the parameters of the reference load and identified load are not presented.

Noted, the initial state is selected assuming no prior information about the load composition. When there is previous load statistics, a better initial state can be derived.

D. Case III: Model Robustness Tests

One of the most important reasons for load modeling is to have a consistent load representation that can closely reflect the real transient dynamics under different contingencies. For that purpose, another three groups of robustness tests are simulated. In the first group, the fault location is changed from bus 1 all the way up to bus 39. In the second group, the fault type is modified from three-phase fault to single-phase-to-ground fault and double-phase-to-ground fault. In the third group, the fault duration is changed from the original 6 cycles (100 ms) to 8 cycles (133.33 ms) and 10 cycles (166.67 ms).

The results of the first group of tests show that when the fault occurs at other buses, the P, Q transient curves of the identified load model still fit the true transient curves very well.

Figure 19A:
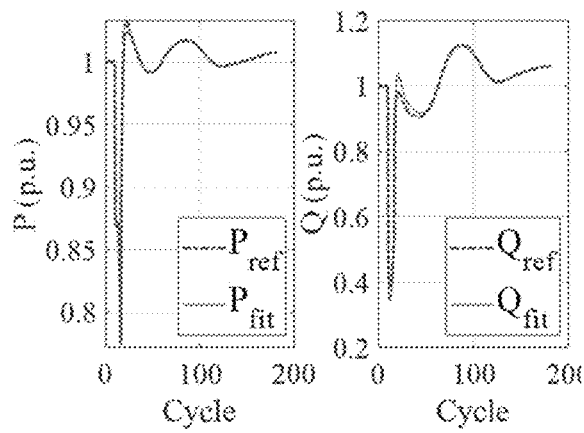
FIG. 19A shows P and Q fitting comparisons when fault occurs at bus 14.
Figure 19B:
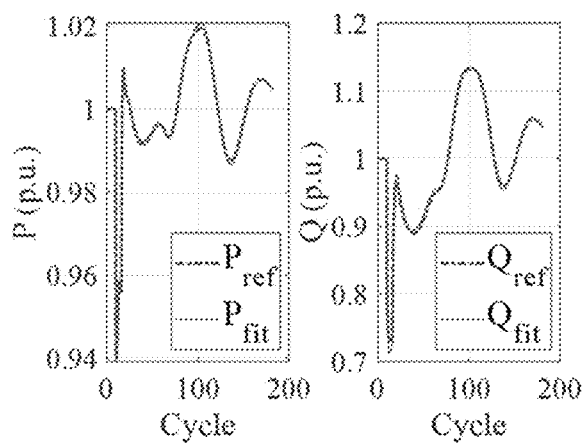
FIG. 19B shows P and Q fitting comparisons when fault occurs at bus 29.

FIG. 19A and FIG. 19B show the P, Q transient examples for faults that occur at bus 14 and bus 29, respectively. In this group of tests, the active power P's fitting RMSE has a mean value of 0.0995% ($0.0255\% \leq RMSE_P \leq 0.2124\%$). For reactive power Q, the mean fitting RMSE is 0.7852% ($0.2374\% \leq RMSE_Q \leq 1.5939\%$). The high dynamic fitting accuracy achieved by the fitted load model demonstrates the proposed load modeling method's robustness towards faults that occur at different locations.

The results of the second group of tests show that the identified load model can capture the transient behaviors of the reference load model under different fault types.

Figure 20A:
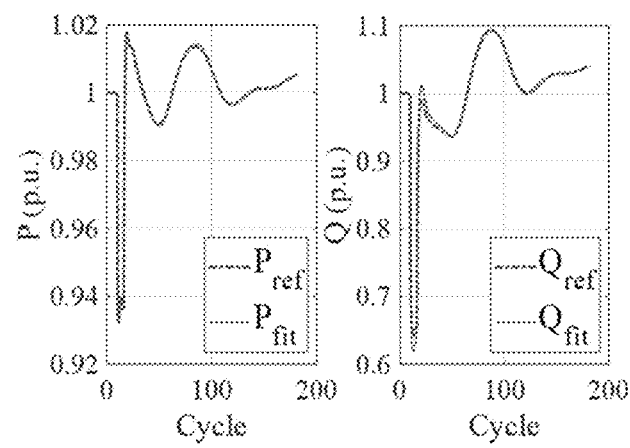
FIG. 20A shows P and Q fitting comparisons for single-phase-to-ground fault.
Figure 20B:
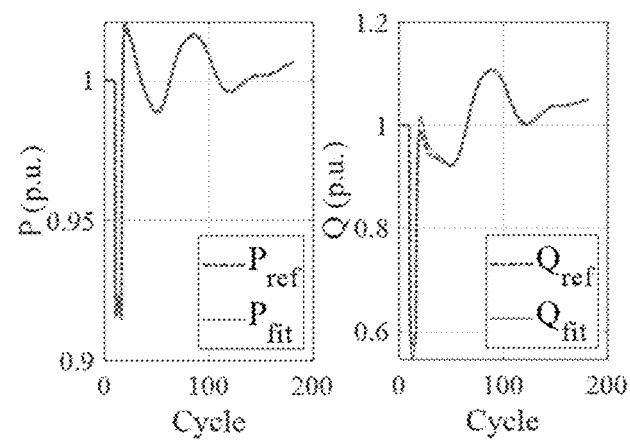
FIG. 20B shows P and Q fitting comparisons for double-phase-to-ground fault.

FIG. 20A and FIG. 20B show the P, Q fitting curves of our identified load model when single-phase-to-ground fault and double-phase-to-ground fault occur at bus 6. The same test at other buses are also conducted. In summary, the mean P fitting RMSE is 0.0714% ($0.0236\% \leq RMSE_P \leq 0.1447\%$); the mean Q fitting RMSE is 0.7216% ($0.2111\% \leq RMSE_Q \leq 1.3372\%$). This test demonstrates the robustness of the proposed load modeling method towards different fault types. The case study also proves the scalability of the method to larger load models.

The results of the third group of tests show that the identified load model can reproduce the responses of the reference load model with different fault durations as well. During the identification phase, the reference event fault is cleared with 6 cycles. Then, longer-duration faults are used to test the robustness of the identified model.

Figure 21A:
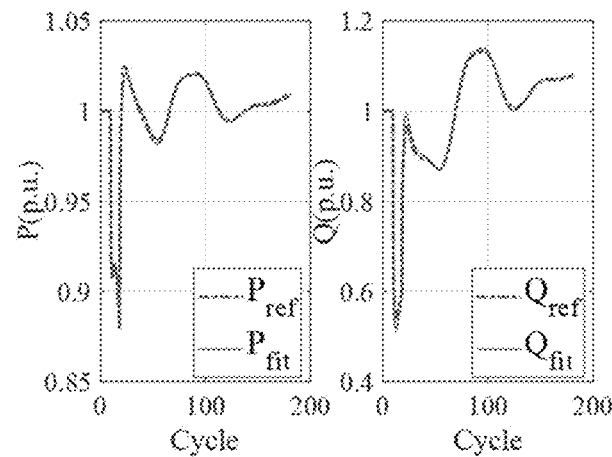
FIG. 21A shows P and Q fitting comparisons for 8-cycle fault at bus 6.
Figure 21B:
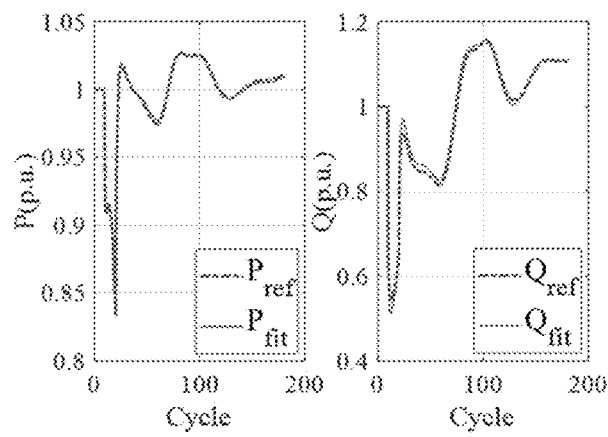
FIG. 21B shows P and Q fitting comparisons for 10-cycle fault at bus 6.

FIG. 21A and FIG. 21B show the P, Q fitting curves when the fault occurs at bus 6 for 8 and 10 cycles. The same test on other buses is also conducted. In summary, when the fault lasts 8 cycles, the mean P fitting RMSE is 0.1008% ($0.07641\% \leq RMSE_P \leq 0.1974\%$); and the mean Q fitting RMSE is 0.8566% ($0.5133\% \leq RMSE_Q \leq 1.7712\%$). When the fault lasts for 10 cycles, the mean P fitting RMSE is 0.1804% ($0.1236\% \leq RMSE_P \leq 0.2113\%$), and the mean Q fitting RMSE is 1.2677% ($0.7323\% \leq RMSE_Q \leq 1.8522\%$). The load profiles are well represented by the identified model, which demonstrates the robustness of the proposed method towards different fault durations.

E. High Penetration of Single-Phase Induction Motor Load

WECC CLM is widely recognized for its capability of modeling the fault induced delayed voltage recovery (FIDVR) event, which is caused by the quickly changing real and reactive power load due to single-phase motor A/C stalling. To simulate an FIDVR event at bus 20, a reference WECC CLM model is generated with a high single-phase induction motor load: $[0.1, 0.1, 0.1, 0.52, 0.1, 0.08]^T$. Then, a three-phase fault occurs at bus 32 at the $9^{th}$ cycle and clears at the $21^{st}$ cycle.

Figure 22:
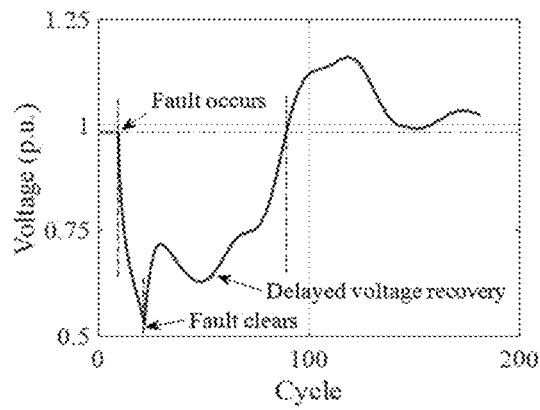

FIG. 22 shows the bus voltage measured at bus 20 when the fault occurs. In this example, the voltage recovers at the $89^{th}$ cycle which is 68 cycles delayed. Based on this FIDVR event, we test the performance of our proposed method for the case with high penetration of single-phase induction motors. Following the same initialization procedure as previous tests, we set the initial load fractions to be $$\left[\frac{1}{6}, \frac{1}{6}, \frac{1}{6}, \frac{1}{6}, \frac{1}{6}, \frac{1}{6}\right]^T.$$

Figure 23A:
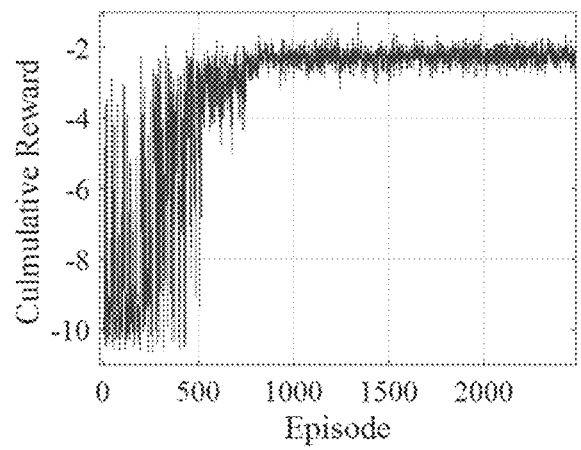
FIG. 23A shows a DDQN training process.
Figure 23B:
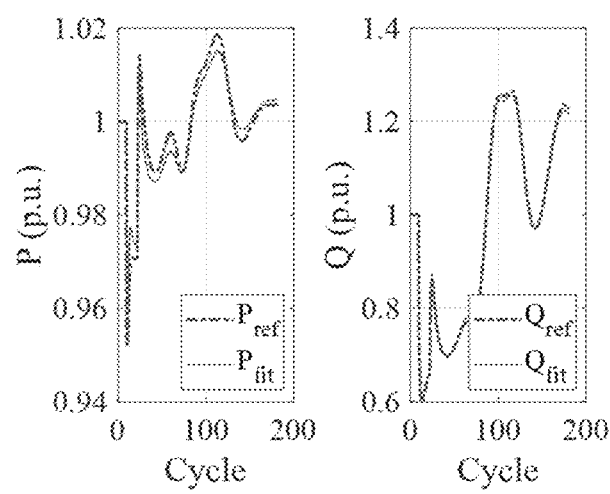
FIG. 23B shows P and Q fitting results.

As shown in FIG. 23A, the training process converges after around 800 episodes, and the final identified load composition solution is $[0.1067, 0.0667, 0.1167, 0.3967, 0.1467, 0.1667]^T$. The dominance of the single-phase induction motor load is identified with the proposed DDQN method. The P, Q curve fitting results are shown in FIG. 23B with a fitting RMSE at 0.28% and 0.70%, respectively. This case study demonstrates the effectiveness of the performance of our proposed method under an FIDVR event.

F. Performance Comparison

Figure 24A:
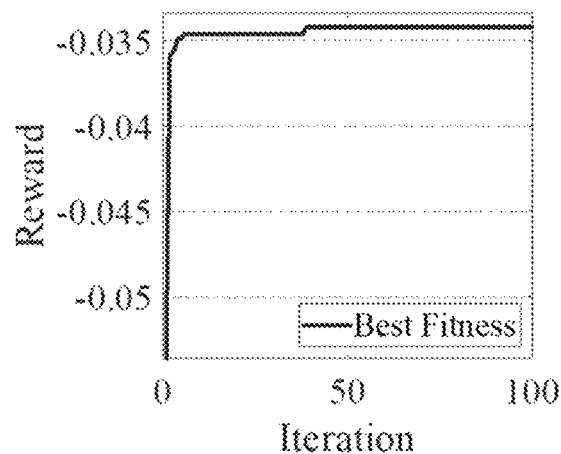
FIG. 24A shows a PSO-based load composition searching.
Figure 24B:
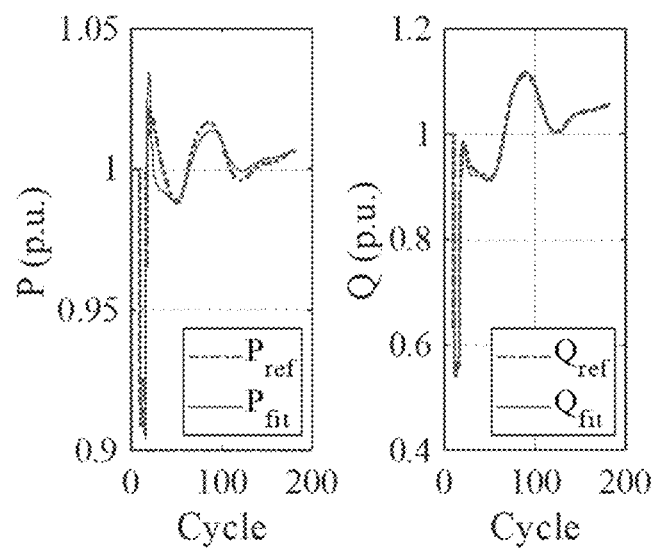
FIG. 24B shows dynamic response comparison between a reference load and a PSO fitted load.

To evaluate the performance of DDQN against other heuristic optimization algorithms, we apply particle swarm optimization (PSO) and genetic algorithm (GA) to optimize the load composition in stage one by using the same reward function. The reference WECC CLM is the same as the one in Case II. Unlike the proposed DDQN method with one single starting point, 30 initial PSO particles are randomly generated and the initial value for each load component is within the range of 1/6±3/100. The result of PSO is shown in FIG. 18. FIG. 24A shows the load composition searching reward, and it stops increasing after 60 iterations. The converged reward is −0.0342 which is much worse than the DDQN fitting accuracy threshold $\lambda$ ($\lambda=-0.012$), as higher values indicates better performances. The best load composition found by PSO is $[0.4536, 0, 0.0226, 0.1694, 0.1582, 0.1964]^T$. Based on this load composition, the Monte-Carlo simulation identified result is shown in FIG. 24B.

For the GA, the same 30 initial PSO particles are adopted as the first generation of GA parents. At each following generation, the top 30 offspring will be selected to reproduce.

Figure 25A:
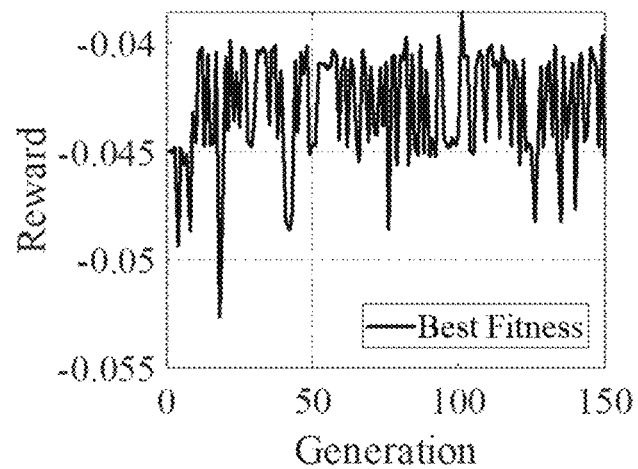
FIG. 25A shows a GA-based load composition searching.
Figure 25B:
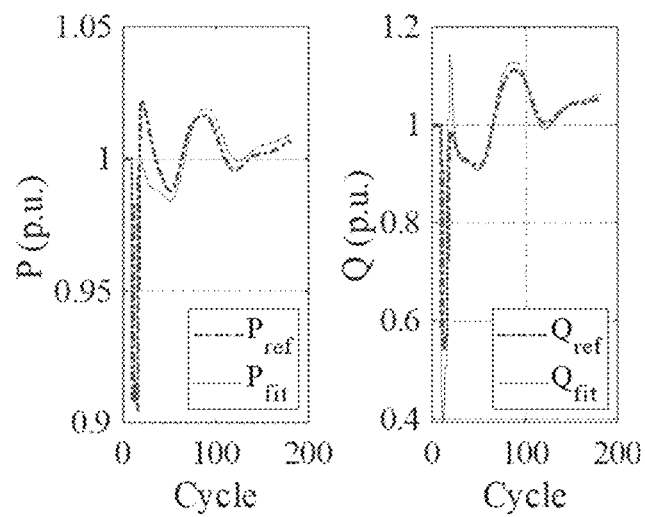
FIG. 25B shows a dynamic response comparison between a reference load and a GA fitted load.

FIG. 25A and FIG. 25B show the simulation results of GA. In FIG. 25A, the plot indicates that the best load composition searching reward reaches −0.0386. In general, the GA's performance is worse than PSO. The best load composition found by GA is $[0.0905, 0.1017, 0.1753, 0.2351, 0.2457, 0.1517]^T$. Based on this load composition, the Monte-Carlo simulation finds the best fitting results as in FIG. 25B.

Table VIII summarizes the P, Q fitting accuracy using the load compositions found by PSO, GA, and DDQN. The proposed DDQN method outperforms PSO and GA by achieving the lowest RMSE. For PSO, its Q fitting accuracy is the same as DDQN. However, its P fitting accuracy is much worse than DDQN. GA has the worst P, Q fitting performances in this case. Since the second-stage parameter identification follows the same procedure for these three methods, this comparison also partially verifies that identifying a proper load composition can greatly improve the dynamic response reconstruction efficiency.

TABLE VIII

Performance Comparison

|  | PSO | GA | DDQN |
| --- | --- | --- | --- |
| RMSE for P | 0.0050 | 0.0075 | 0.0012 |
| RMSE for Q | 0.0065 | 0.0358 | 0.0064 |

We conducted other two groups of comparison between PSO, GA, and DDQN, the results consistently show that DDQN's performance are better than PSO and GA, and PSO's performance is better than GA. This comparison also verifies that identifying a proper load composition can greatly improve the parameter fitting efficiency.

G. Impact of Initial Point on the Algorithm Performance

The proposed load modeling method nonlinearly optimizes the load compositions.

It is critical to evaluate the impacts of the initial point selection on the identification results. In this section, we design another WECC CLM with a reference load composition as $s_{WECC}=[0.1, 0.15, 0.1, 0.2, 0.1, 0.35]^T$. Then we conduct the two load modeling tests, Test-Rand and Test-Close, using two different initial points. The initial point for Test-Rand is the same as the Case II, which is $[1/6, 1/6, 1/6, 1/6, 1/6, 1/6]^T$. The initial point for Test-Close is designed to be very close to the reference load composition, which is $[0.08, 0.1, 0.13, 0.22, 0.07, 0.4]^T$. By comparing Test-Rand with Test-Close, we can evaluate the impacts of different initial points on the same case.

Table IX shows the identified load compositions and P, Q fitting RMSE of Test-Rand and Test-Close.

TABLE IX

Performance Comparison

| | | True | Test-Rand | Test-Close |
| --- | --- | --- | --- | --- |
| Stage one | IM_A | 0.1000 | 0.0967 | 0.0900 |
| | IM_B | 0.1500 | 0.1667 | 0.1500 |
| | IM_C | 0.1000 | 0.1667 | 0.0800 |
| | IM_1p | 0.2000 | 0.1467 | 0.2100 |
| | ELC | 0.1000 | 0.1667 | 0.0700 |
| | ZIP | 0.3500 | 0.2567 | 0.4000 |
| | Static Load | 0.4500 | 0.4234 | 0.4700 |
| | Dynamic Load | 0.5500 | 0.5766 | 0.5300 |
| | Pinball Loss | | 0.0134 | 0.0125 |
| Stage two | P fitting RMSE | | 0.0011 | 0.0013 |
| | Q fitting RMSE | | 0.0046 | 0.0019 |

Figure 26A:
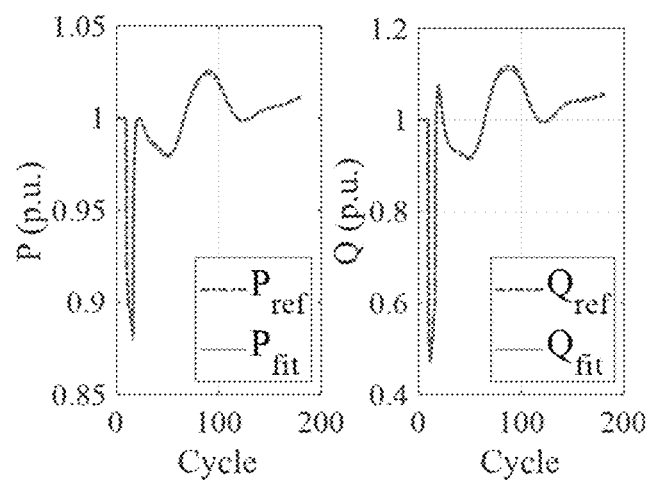
FIG. 26A shows fitted P, Q curves for Test-Rand.
Figure 26B:
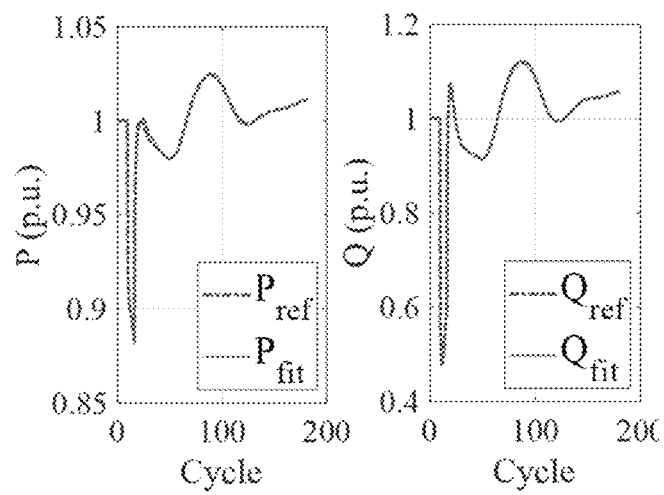
FIG. 26B shows fitted P, Q curves for Test-Close.

FIG. 26A and FIG. 26B shows the P, Q fitting curves for Test-Rand and Test-Close. Both Test-Rand and Test-Close achieve good load modeling results not matter for pinball loss or RMSE. Test-Rand is slightly better than Test-Close in P fitting RMSE, but slightly worse in Q fitting RMSE. Overall, two identified solutions are reasonably close to the true compositions. As load is constantly changing, how to obtain a "close" initial point is also non-trivial. It is good to have a close initial point to start with, but it is not required. The proposed method can effectively identify the load model and its parameters through proposed DDQN method.

H. Fit ZIP+IM and CLOD Using WECC CLM

Figure 27A:
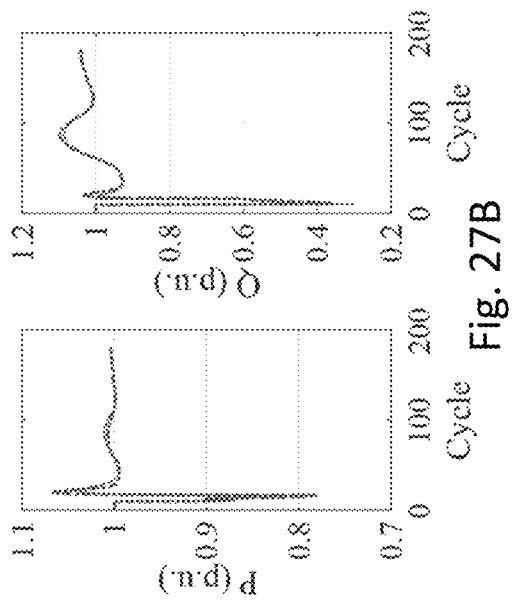
FIG. 27A shows a DDQN learning process for fitting the ZIP+IM's dynamics using the WECC CLM.
Figure 27B:
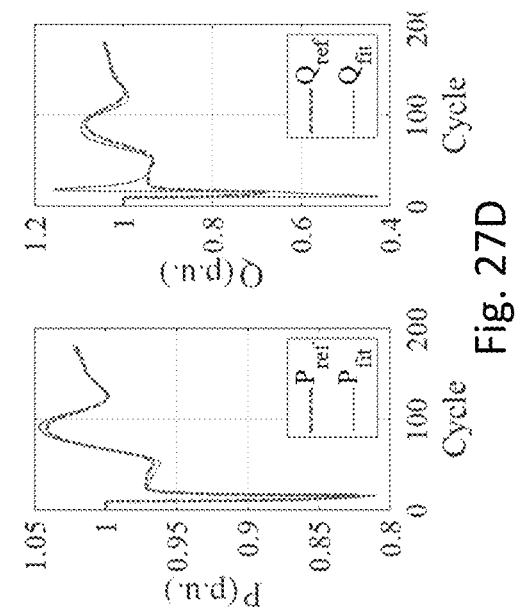
FIG. 27B shows the WECC CLM fitting results for the ZIP+IM.
Figure 27C:
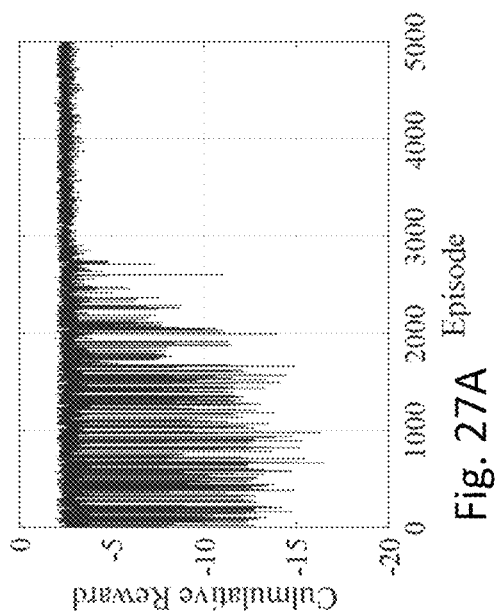
FIG. 27C shows a DDQN learning process for fitting the CLOD's dynamics using the WECC CLM.
Figure 27D:
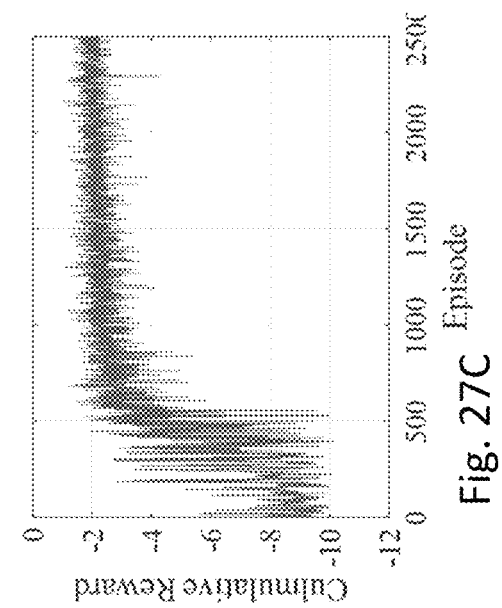
FIG. 27D shows the WECC CLM fitting results for the CLOD.

To further evaluate how the WECC CLM approximates other composite load models, we conduct a group of tests using WECC CLM to approximate the load dynamics generated from ZIP+IM and CLOD at bus 20 in the IEEE 39-bus system. See A. S. Hoshyarzadeh, H. Zareipour, P. Keung, and S. S. Ahmed, "The Impact of CLOD Load Model Parameters on Dynamic Simulation of Large Power Systems," in 2019 *IEEE International Conference on Environment and Electrical Engineering and* 2019 *IEEE Industrial and Commercial Power Systems Europe (EEEIC/I&CPS Europe)*, Genova, Italy, 2019, pp. 1-6; and S. Li, X. Liang and W. Xu, "Dynamic load modeling for industrial facilities using template and PSS/E composite load model structure CLOD," in 2017 *IEEE/IAS 53rd Industrial and Commercial Power Systems Technical Conference (I&CPS)*, Niagara Falls, ON, 2017, pp. 1-9. The parameters for CLOD are selected following WECC 2001 CLOD generic parameters. Then, we treat the dynamic responses from the ZIP+IM and CLOD load model as the field measurements, and our DDQN agent is trained to identify WECC CLM parameters to reproduce these P, Q dynamics. The training progress for fitting the dynamics from the ZIP+IM is shown in FIG. 27A, and the training converges after 3,000 episodes. The P, Q fitting results are shown in FIG. 27B, and the fitting RMSE of P and Q are shown in Table IIX. Similarly, the training results for CLOD is shown in FIG. 27C and FIG. 27D and Table IIX. For CLOD, the training converges after 1,000 episodes.

TABLE IIX

Fitting Results

| ZIP + IM | | ZIP (%) 60 | | | | IM (%) 40 | | | |
|---|---|---|---|---|---|---|---|---|---|
| Identified: | IM_A | IM_B | IM_C | IM_D | | ZIP | | ELC | |
| WECC CLM | 18.67% | 16.67% | 16.67% | 16.67% | | 16.67% | | 14.67% | |
| | RMSE for P: 0.0074 | | | | | RMSE for Q: 0.0161 | | | |
| CLOD | Small Motor | Large Motor | Discharging Lighting | Transformer Saturation | Constant MVA | | Kp | R | X |
| | 10% | 10% | 0% | 0% | 0% | | 1 | 0 | 0 |
| Identified: | IM_A | IM_B | IM_C | IM_D | | ZIP | | ELC | |
| WECC CLM | 1.67% | 16.67% | 15.67% | 16.67% | | 32.67% | | 16.67% | |
| | RMSE for P: 0.0035 | | | | | RMSE for Q: 0.0611 | | | |

According to the test result, our proposed method can accurately replicate the dynamics of a ZIP+IM using WECC CLM. However, due to the unique components contained in CLOD, only the P fitting accuracy using WECC CLM is satisfactory, and the Q fitting accuracy is not as good as the one in P.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

What is claimed is:

1. A method for generating a load model having composite load components for an electric power system, the method comprising:
   acquiring state information at a bus of the electric power system;
   acquiring a training event record; and
   generating the load model by sequentially executing steps of:
   determining a final load component composition for a predetermined composite load model structure referencing to both the state information and the training event record; and
   determining a plurality of final load parameters corresponding to the final load component composition and the predetermined load model structure also referencing to both the state information and the training event record
   wherein the determining the final load component composition comprises:
      initializing a plurality of load component compositions;
      optimizing the plurality of the initial load component compositions with a machine learning agent to generate a predetermined number of top load component compositions;
      calculating quantile loss for each of the top load component compositions with a predefined quantile level; and
      selecting one of the top load component compositions that has the lowest quantile loss as the final load component composition.

2. The method of claim 1, wherein the state information includes a network topology and magnitudes and angles of current, voltage and power phasors at the bus.

3. The method of claim 2, wherein the magnitudes of current, voltage and power are measured by a phasor measurement units (PMU) and supervisory control and data acquisition (SCADA) system coupled to the bus.

4. The method of claim 1, wherein the predetermined composite load model structure is selected from the group consisting of Western Electricity Coordinating Council Composite Load Model (WECC CLM), ZIP and induction motors model (ZIP+IM), ZIP, Complex Load Model (CLOD).

5. The method of claim 1, the training event record includes voltage, real power and reactive power data and event type used for generating a reference curve.

6. The method of claim 1, wherein the machine learning agent is a deep reinforcement learning (DRL) agent.

7. The method of claim 6, wherein the optimization comprises:
   sampling a plurality of load parameter sets;
   running dynamic simulations for each of the plurality of load parameter sets with the training event record;
   obtaining dynamic response curves for each of the plurality of load parameter sets;
   evaluating the dynamic response curves with a reward function; and
   identifying the top load component compositions based on the evaluation.

8. The method of claim 7 further comprising an agent training initialization by setting fixed values to certain parameters.

9. The method of claim 7, wherein the sampling uses Monte-Carlo simulation.

10. The method of claim 7 further comprising adjusting load component compositions and re-run the dynamic simulations.

11. The method of claim 1, wherein the determining the plurality of final load parameters comprises:
   fixing the final load component composition;
   generating a plurality of sets of parameter values from predetermined parameter ranges;
   generating a dynamic response curve for each of the plurality of sets of parameter values;
   evaluating the generated dynamic response curves in reference to the training event record; and
   selecting one of the plurality of sets of parameter values for the plurality of final load parameters based on a predetermined criterion.

12. The method of claim 11, wherein the plurality of sets of parameter values are generated by Monte-Carlo simulation.

13. The method of claim 11, wherein the evaluating calculates root mean squared error (RMSE) of the dynamic response curves.

14. The method of claim 13, wherein the predetermined criterion is that the plurality of final load parameters has the lowest RMSE.

15. An electric power load modeling system comprising:
a load;
a bus connected to the load;
a measurement device coupled to the bus for measuring electric state at the bus;
a processor;
a database storing a training event record; and
a computer-readable storage medium, comprising:
software instructions executable on the processor to perform operations, including:
acquiring state information at the bus from the measurement device;
acquiring the training event record from the database;
generating a composite load model by sequentially executing steps of:
determining a final load component composition for a predetermined composite load model structure referencing to both the state information and the training event record; and
determining a plurality of final load parameters corresponding to the final load component composition and the predetermined load model structure also referencing to both the state information and the training event record,
wherein the determining the plurality of final load parameters by the software instructions executable on the processor comprises:
fixing the final load component composition;
generating a plurality of sets of parameter values from predetermined parameter ranges;
generating a dynamic response curve for each of the plurality of sets of parameter values;
evaluating the generated dynamic response curves by calculating root mean squared error (RMSE) of the dynamic response curves in reference to the training event record; and
selecting one of the plurality of sets of parameter values with a dynamic response curve having the lowest RMSE for the plurality of final load parameters.

16. The electric power load modeling system of claim 15, wherein the determining the final load component composition by the software instructions executable on the processor comprises:
initializing a plurality of load component compositions;
optimizing the plurality of the initial load component compositions with a machine learning agent to generate a predetermined number of top load component compositions;
calculating quantile loss for each of the top load component compositions with a predefined quantile level; and
selecting one of the top load component compositions that has the lowest quantile loss as the final load component composition.

17. The electric power load modeling system of claim 16, wherein the machine learning agent is a deep reinforcement learning (DRL) agent.

18. The electric power load modeling system of claim 17, wherein the optimization by the software instructions executable on the processor comprises:
sampling a plurality of load parameter sets;
running dynamic simulations for each of the plurality of load parameter sets with the training event record;
obtaining dynamic response curves for each of the plurality of load parameter sets;
evaluating the dynamic response curves with a reward function; and
identifying the top load component compositions based on the evaluation.

19. The electric power load modeling system of claim 18 further comprising an agent training initialization by setting fixed values to certain parameters.

20. The electric power load modeling system of claim 18 further comprising adjusting load component compositions and re-run the dynamic simulations.

21. A method for generating a load model having composite load components for an electric power system, the method comprising:
acquiring state information at a bus of the electric power system;
acquiring a training event record; and
generating the load model by sequentially executing steps of:
determining a final load component composition for a predetermined composite load model structure referencing to the state information and the training event record; and
determining a plurality of final load parameters corresponding to the final load component composition and the predetermined load model structure using a curve fitting process approximating a modeled curve based on the state information to a reference curve generated by the training event record,
wherein the determining the final load component composition comprises:
initializing a plurality of load component compositions;
optimizing the plurality of the initial load component compositions with a deep reinforcement learning (DRL) agent to generate a predetermined number of top load component compositions;
calculating quantile loss for each of the top load component compositions with a predefined quantile level; and
selecting one of the top load component compositions that has the lowest quantile loss as the final load component composition.

22. The method of claim 21, wherein the determining the plurality of final load parameters comprises:
fixing the final load component composition;
generating a plurality of sets of parameter values by Monte-Carlo simulation from predetermined parameter ranges;
generating a dynamic response curve for each of the plurality of sets of parameter values;
evaluating the generated dynamic response curves by calculating root mean squared error (RMSE) of the generated dynamic response curves in reference to the training event record; and
selecting one of the plurality of sets of parameter values with a dynamic response curve having the lowest RMSE for the plurality of final load parameters.

* * * * *